(12) United States Patent
Shinkai

(10) Patent No.: US 7,796,856 B2
(45) Date of Patent: Sep. 14, 2010

(54) INFORMATION PROCESSING APPARATUS AND METHOD, AND PROGRAM THEREFOR

(75) Inventor: Mitsutoshi Shinkai, Kanagawa (JP)

(73) Assignee: Sony Corporation, Tokyo (JP)

(*) Notice: Subject to any disclaimer, the term of this patent is extended or adjusted under 35 U.S.C. 154(b) by 1828 days.

(21) Appl. No.: 10/843,399

(22) Filed: May 12, 2004

(65) Prior Publication Data

US 2005/0008327 A1    Jan. 13, 2005

(30) Foreign Application Priority Data

May 13, 2003    (JP)  ............................ P2003-134707

(51) Int. Cl.
| | |
|---|---|
| H04N 5/93 | (2006.01) |
| H04N 1/46 | (2006.01) |
| H04N 5/00 | (2006.01) |
| H04N 5/91 | (2006.01) |
| H04N 7/26 | (2006.01) |
| G06F 3/06 | (2006.01) |
| G06F 9/26 | (2006.01) |
| G06F 13/00 | (2006.01) |
| G06K 1/00 | (2006.01) |
| G06K 15/00 | (2006.01) |
| G11B 19/02 | (2006.01) |

(52) U.S. Cl. .......................... 386/52; 386/46; 386/54; 386/92; 386/95; 386/96; 386/124; 386/125; 358/1.1; 358/1.16; 358/1.17; 358/501; 360/69; 360/72.1; 711/4; 711/115; 711/203

(58) Field of Classification Search .................. 386/52, 386/46, 54, 95, 96, 124, 125, 92, E5.001; 711/4, 203, 115; 358/1.16, 501, 1.1, 1.17; 360/69, 72.1; 707/E17.01

See application file for complete search history.

(56) References Cited

U.S. PATENT DOCUMENTS

| 4,447,837 A | * | 5/1984 | Hirata et al. ................. 386/118 |
| 5,280,392 A | * | 1/1994 | Koo ............................ 386/52 |

(Continued)

FOREIGN PATENT DOCUMENTS

JP    09-200680    7/1997

(Continued)

OTHER PUBLICATIONS

Japanese Office Action; Application No. 2003-134707; Dated: Mar. 28, 2007.

*Primary Examiner*—Thai Tran
*Assistant Examiner*—Syed Y Hasan
(74) *Attorney, Agent, or Firm*—Rader, Fishman & Grauer PLLC

(57) ABSTRACT

An optical disk contains main video data obtained by compressing pictures captured by a video camera at a relatively low compression ratio, low resolution proxy video data obtained by performing compression at a compression ratio higher than that for the main video data, metadata for use in editing. When a state in which the optical disk 2 is loaded into a drive of an optical disk apparatus is detected, the proxy video data and the metadata are read and recorded in a hard disk drive (HDD) without receiving a user's instruction. The proxy video data and metadata recorded in the HDD are used in simple editing before main editing in which the main video data is edited.

6 Claims, 21 Drawing Sheets

U.S. PATENT DOCUMENTS

| | | | |
|---|---|---|---|
| 6,476,929 B1 * | 11/2002 | Tanaka | 358/1.17 |
| 6,542,695 B1 * | 4/2003 | Akiba et al. | 386/125 |
| 6,546,460 B1 * | 4/2003 | Iida et al. | 711/115 |
| 6,553,456 B2 * | 4/2003 | Tadokoro et al. | 711/112 |
| 6,556,769 B1 * | 4/2003 | Akahane et al. | 386/46 |
| 6,577,807 B1 * | 6/2003 | Yaegashi et al. | 386/52 |
| 6,647,498 B1 * | 11/2003 | Cho | 726/17 |
| 2002/0057894 A1 * | 5/2002 | Ishige | 386/46 |
| 2002/0073275 A1 * | 6/2002 | Tsurumaki et al. | 711/112 |
| 2002/0114613 A1 * | 8/2002 | Thai | 386/52 |
| 2002/0184651 A1 * | 12/2002 | Matsushita | 725/131 |
| 2003/0231343 A1 * | 12/2003 | Kobayashi et al. | 358/1.16 |

FOREIGN PATENT DOCUMENTS

| | | | |
|---|---|---|---|
| JP | 11-136631 | * | 5/1999 |
| JP | 2002-269905 | | 9/2002 |
| WO | WO 01/60062 A1 | | 8/2001 |

* cited by examiner

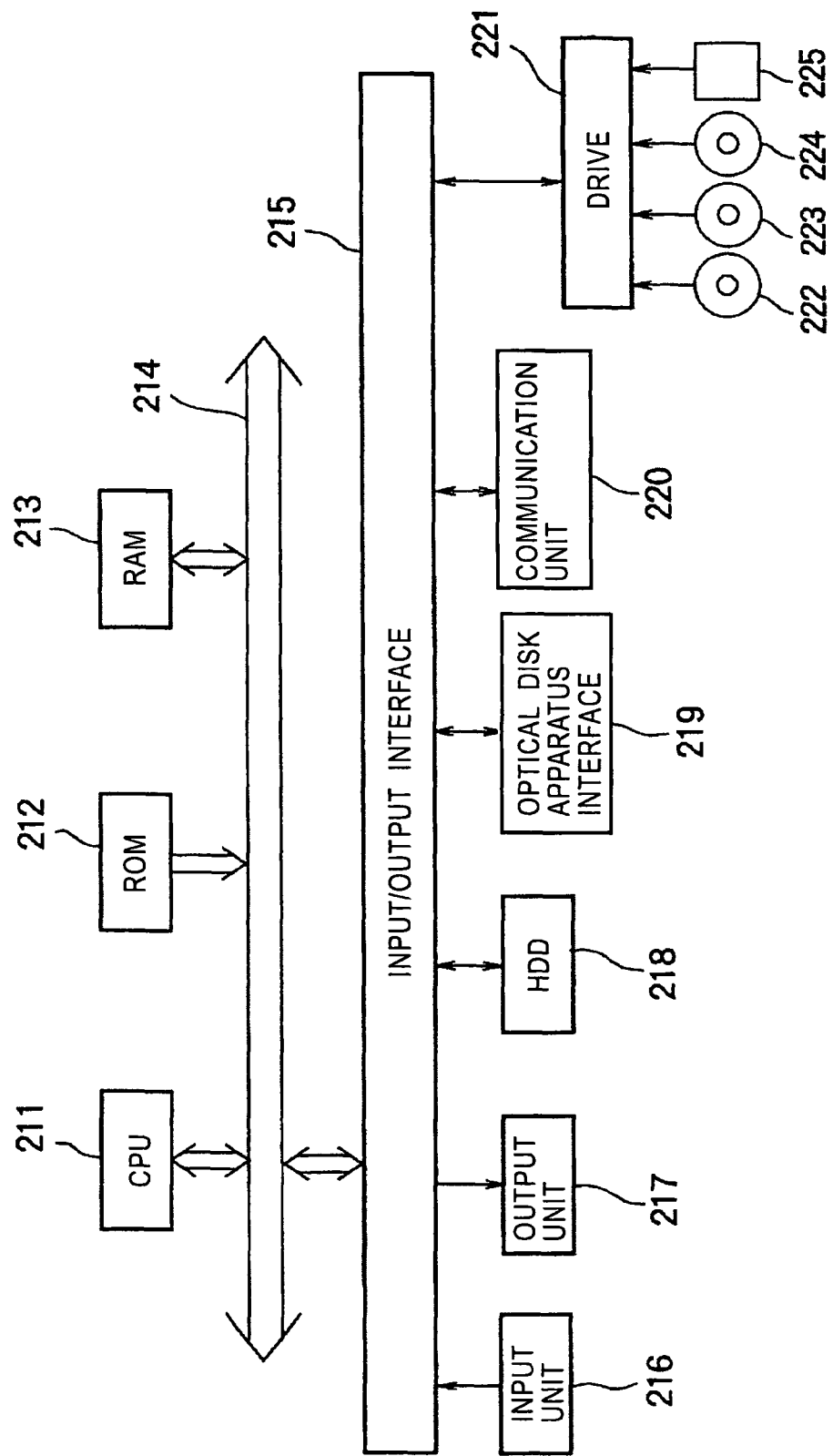

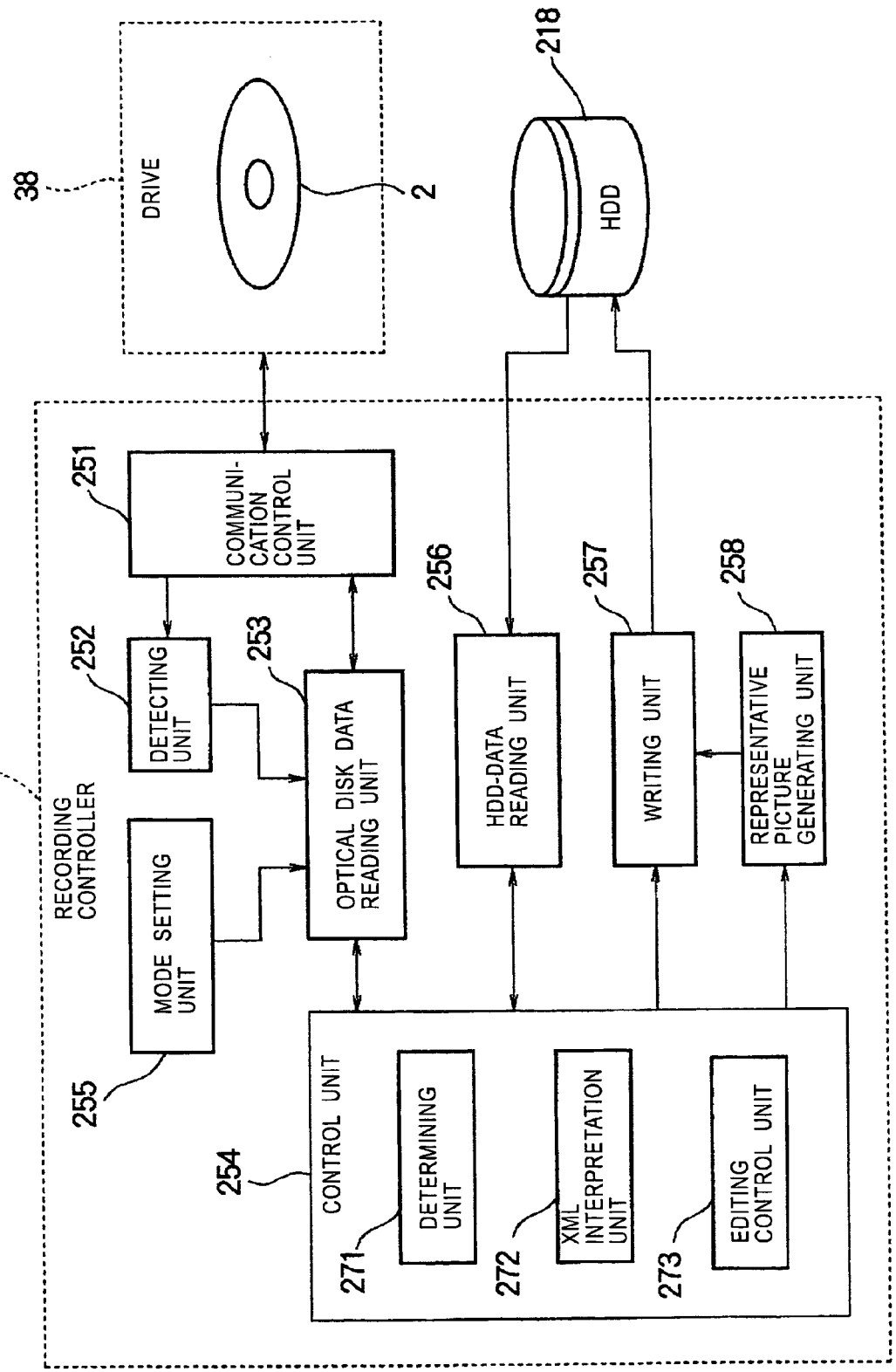

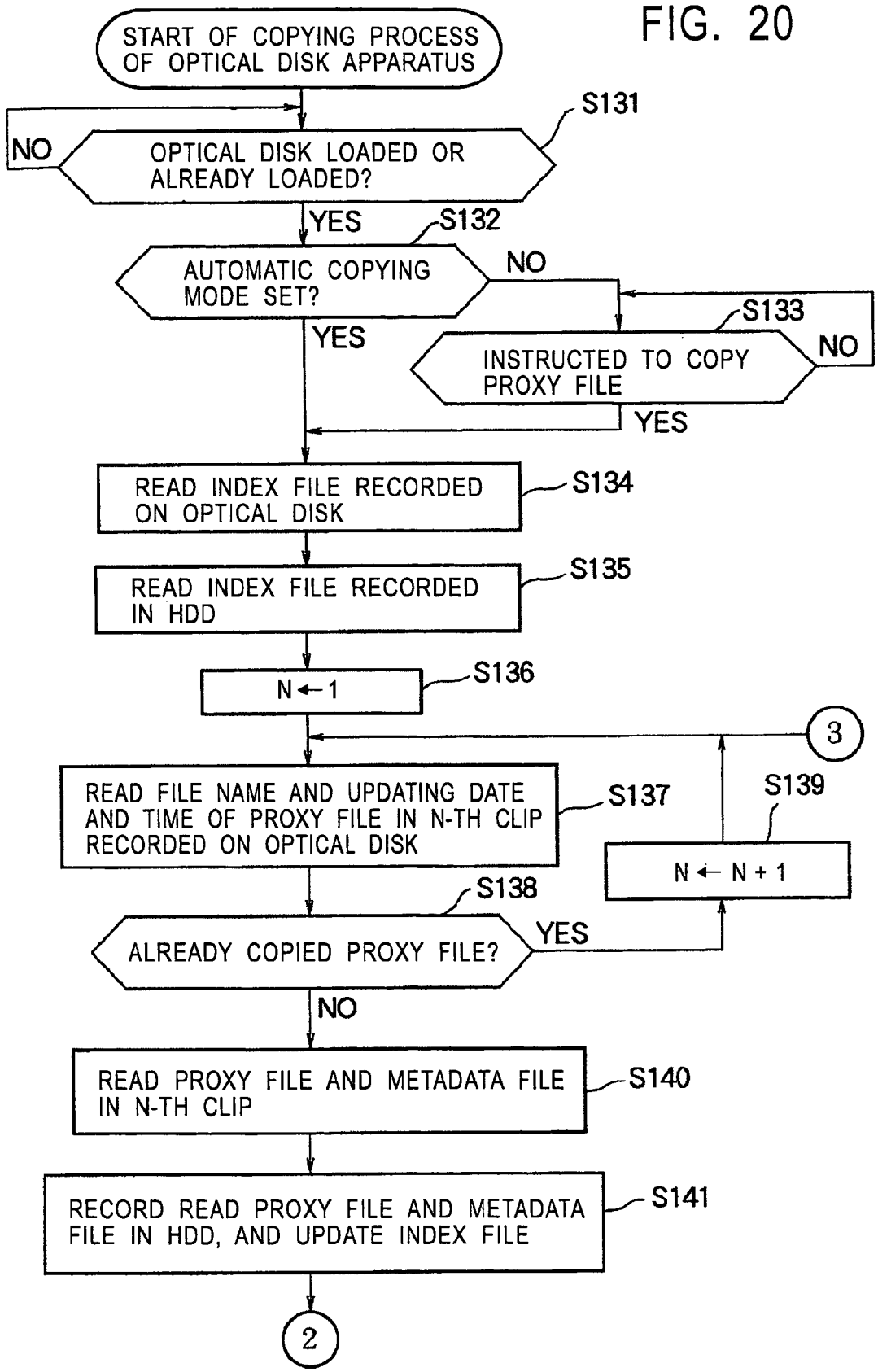

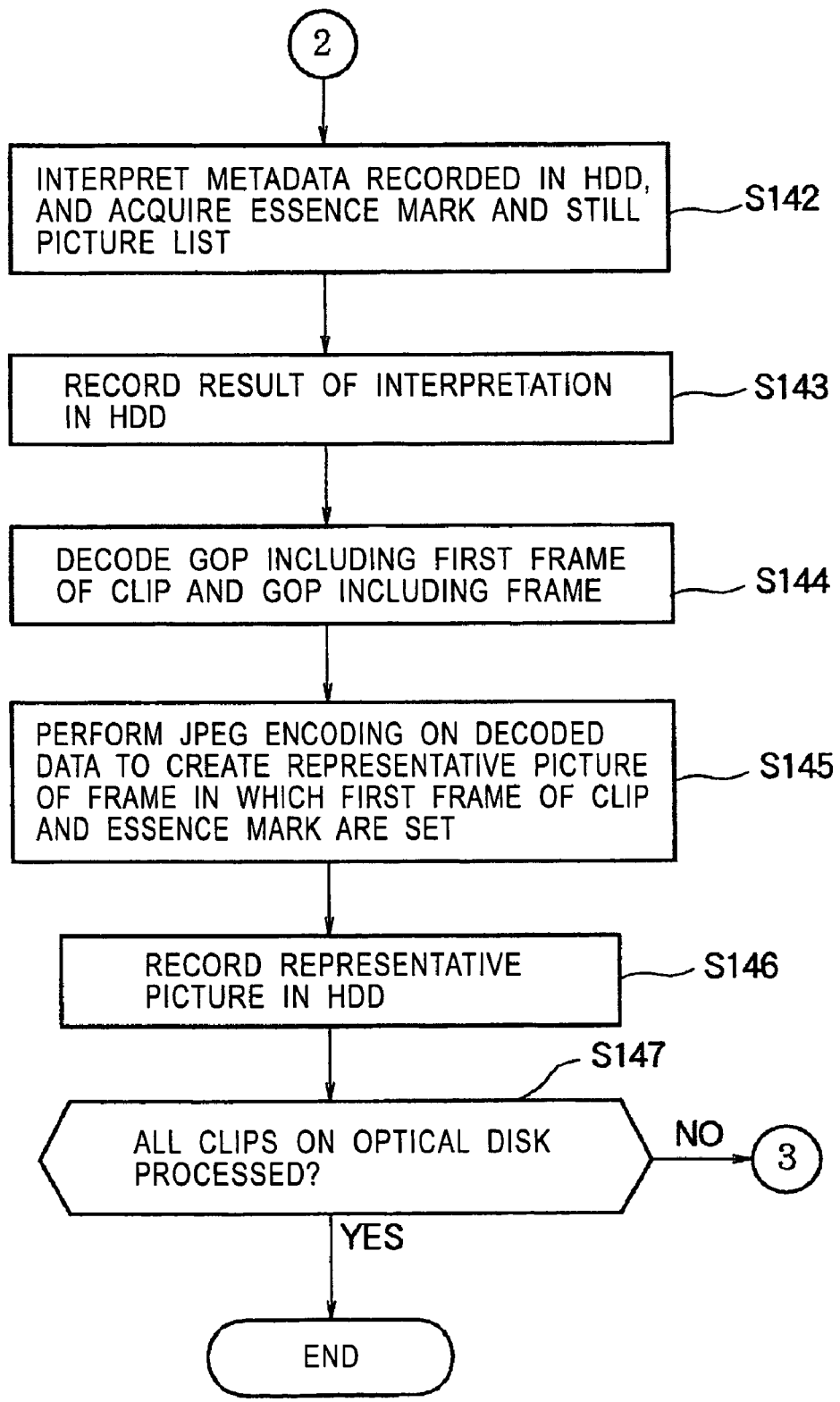

INFORMATION PROCESSING APPARATUS AND METHOD, AND PROGRAM THEREFOR

BACKGROUND OF THE INVENTION

1. Field of the Invention

The present invention relates to information processing apparatuses and methods, and programs therefor, and in particular, to an information processing apparatus and method that can easily and quickly initiate editing, and a program therefor.

2. Description of the Related Art

In recent years, optical disks have become used as recording media for broadcasting-service camcorders because of their mass storage and increased data transfer speed. For example, a type of optical disk on which video data and audio data are recorded by blue-violet light-emitting diodes has approximately 2.3 GB in the case of single-side recording, and has a data transfer speed (recording rate) of 50 Mbps or greater, though it differs depending on a data compression ratio.

In the case of capturing pictures by using the above optical disk and a broadcasting-service camcorder, the camcorder records, on the optical disk, not only main data obtained by compressing the captured pictures at a relatively low compression ratio so as to prevent picture quality from deteriorating, but also data, such as proxy video data (low-resolution video data), obtained by compressing the captured pictures at a compression ratio higher than that of the main data (see, for example, International Publication No. 01/60062 pamphlet).

For captured sound, not only main audio data, but also proxy audio data having a high compression ratio is created, if needed.

In recent years, proxy video data and proxy audio data have become commonly used. Both types of data are used for so-called nonlinear editing. After being captured by a personal computer, they are used as material for the editing. When the personal computer or the like is used to perform nonlinear editing, its processing ability will become insufficient, so that it is impossible for high-recording-rate main data as described above to be directly used as material to be edited.

Editing in which proxy video data is used as material may be called "proxy editing". The proxy editing is performed as simple editing in, for example, a place for picture capturing. The result of the proxy editing is transmitted to a piece of equipment, such as an apparatus in a studio for final data for broadcasting, through a network, separately from main data which is to be delivered in a form recorded on an optical disk. In that studio, the main data is edited based on the transmitted result of the proxy editing. This creates final video data for broadcasting.

In order to perform the proxy editing in the place for picture capturing by using an optical disk apparatus having a built-in hard disk, after removing, from the camcorder, an optical disk having captured data, the editor must perform a consecutive operation of loading the optical disk into the optical disk apparatus, and operating the optical disk apparatus to select proxy video data and proxy audio data (files) to be stored on the hard disk.

Accordingly, when video data and audio data are recorded on a plurality of optical disks by picture capturing for a long time, a problem occurs in that an operation up to proxy editing is complicated since the editor must perform the consecutive operation for the number of optical disks in order to initiate editing.

SUMMARY OF THE INVENTION

The present invention has been made in view of the above circumstances. It is an object of the present invention to enable editing to be easily and quickly initiated.

According to an aspect of the present invention, an information processing apparatus is provided which includes a detection unit for detecting loading of a removable recording medium, and a recording control unit for automatically recording proxy data in another recording medium in response either to the loading of the recording medium in a power-on state, or a power-supplied state with the recording medium loaded.

Preferably, the information processing apparatus has an automatic copying mode and a manual copying mode. In the automatic copying mode, the recording control unit automatically records the proxy data in the other recording medium, and, in the manual copying mode, the recording control unit records the proxy data in the other recording medium in response to a user's copying instruction.

On the recording medium, first data of main video or main audio, and second data having an amount less than that of the first data may be recorded. The second data may include proxy data identical in content to the first data.

The information processing apparatus may further include a generating unit for generating, based on the second data, a representative picture to be displayed on an editing screen. The recording control unit performs recording of the representative picture in the other recording medium as well as the recording of the proxy data in the other recording medium.

At least part of a frame forming picture data in data recorded in the recording medium may have preset characteristic information representing the frame. Based on the second data, a still picture of the frame having the preset characteristic information may be generated as the representative picture by the generating unit.

According to another aspect of the present invention, an information processing method is provided which includes the steps of detecting loading of a removable recording medium, and recording proxy data in another recording medium in response either to the loading of the recording medium in a power-on state, or to a power-supplied state with the recording medium loaded.

According to another aspect of the present invention, a program for allowing a computer to execute information processing is provided. The information processing includes the steps of detecting loading of a removable recording medium, and recording proxy data in another recording medium in response either to the loading of the recording medium in a power-on state, or to a power-supplied state with the recording medium loaded.

According to the present invention, predetermined data recorded on a recording medium can be copied onto another recording medium.

In addition, according to the present invention, a user can quickly and easily initiate editing.

BRIEF DESCRIPTION OF THE DRAWINGS

FIG. 14 is a block diagram showing an example of the personal computer shown in FIG. 13;

FIG. 15 is a block diagram showing the functional configuration of the personal computer;

FIG. 20 is a flowchart illustrating another copying process of the optical disk apparatus; and FIG. 21 is a flowchart continued from the flowchart shown in FIG. 20, which illustrates the copying process of the optical disk apparatus.

DESCRIPTION OF THE PREFERRED EMBODIMENTS

Figure 1:
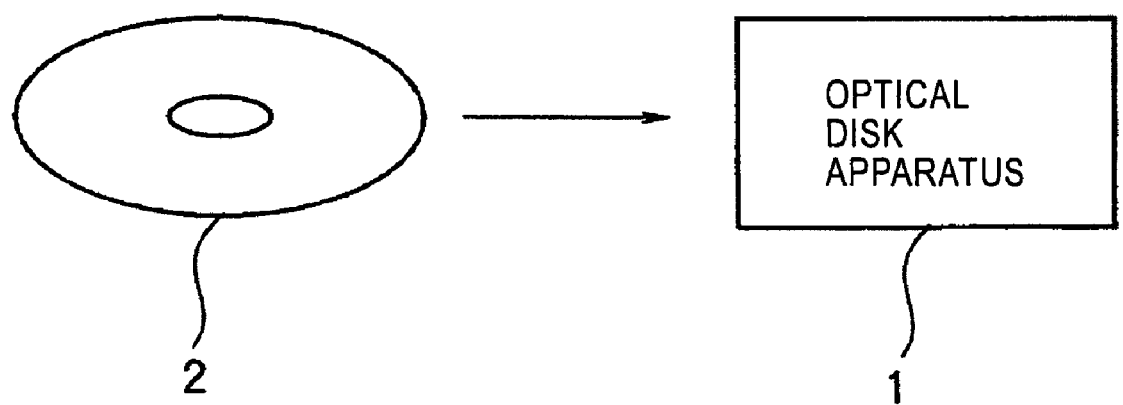
FIG. 1 is an illustration of an optical disk apparatus to which the present invention is applied, and an optical disk to be loaded into the optical disk apparatus.

FIG. 1 is an illustration of an optical disk apparatus 1 to which the present invention is applied, and an optical disk 2 that is a recording medium loadable into the optical disk apparatus 1.

The optical disk apparatus 1 is, for example, an apparatus for performing simple editing of a place for picture capturing. The optical disk 2 contains data of pictures and sound captured by a video camera (not shown). The optical disk 2, which contains the captured data, contains, not only main video data, but also proxy video data obtained by reducing the resolution of the video data. In addition, proxy audio data obtained by compressing main audio data, etc., is created at picture-capturing by video camera, if needed, and is recorded on the optical disk 2.

Figure 2:
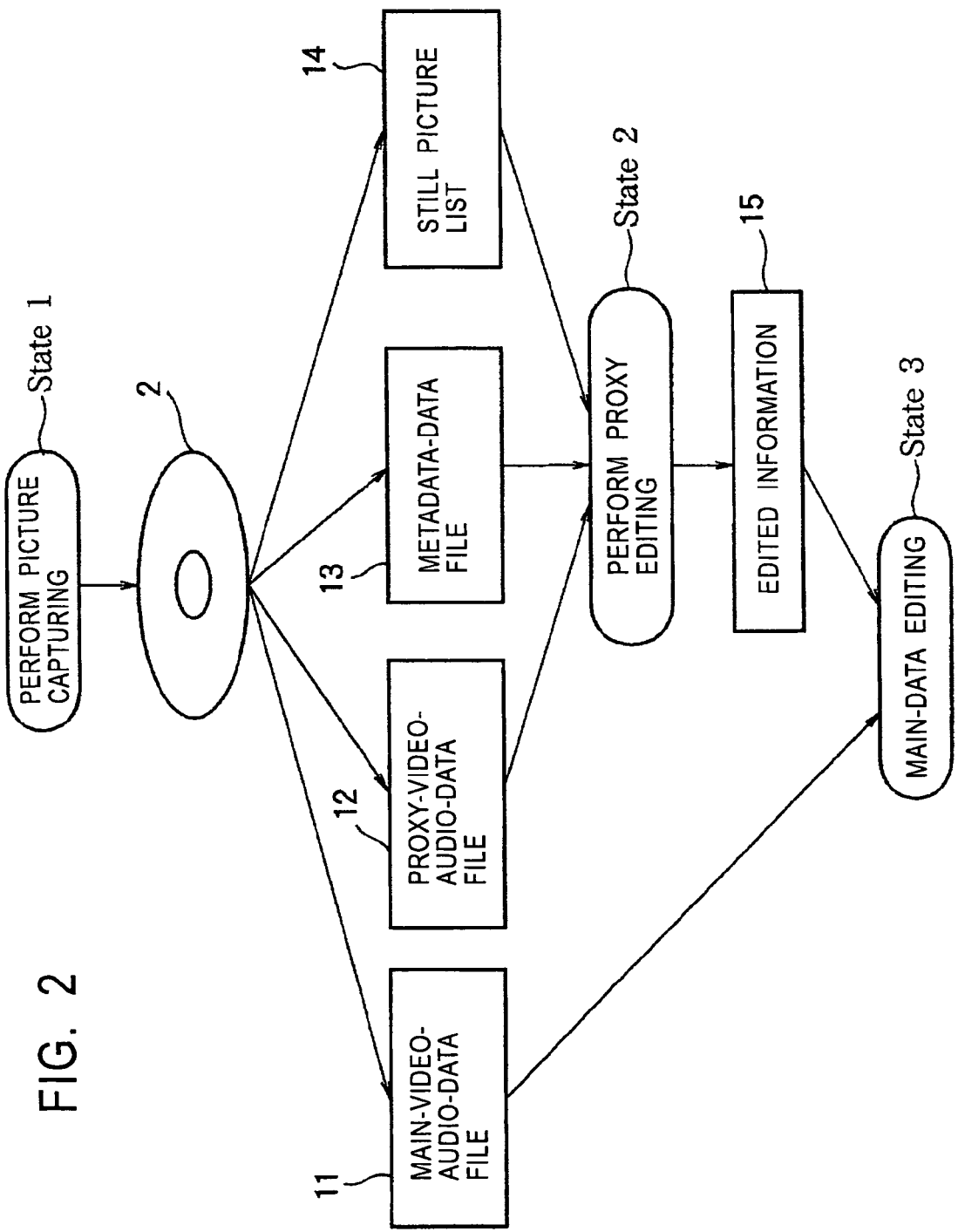
FIG. 2 is an illustration of data recorded on an optical disk, which contains captured data, and an example of editing the data.
Figure 3:
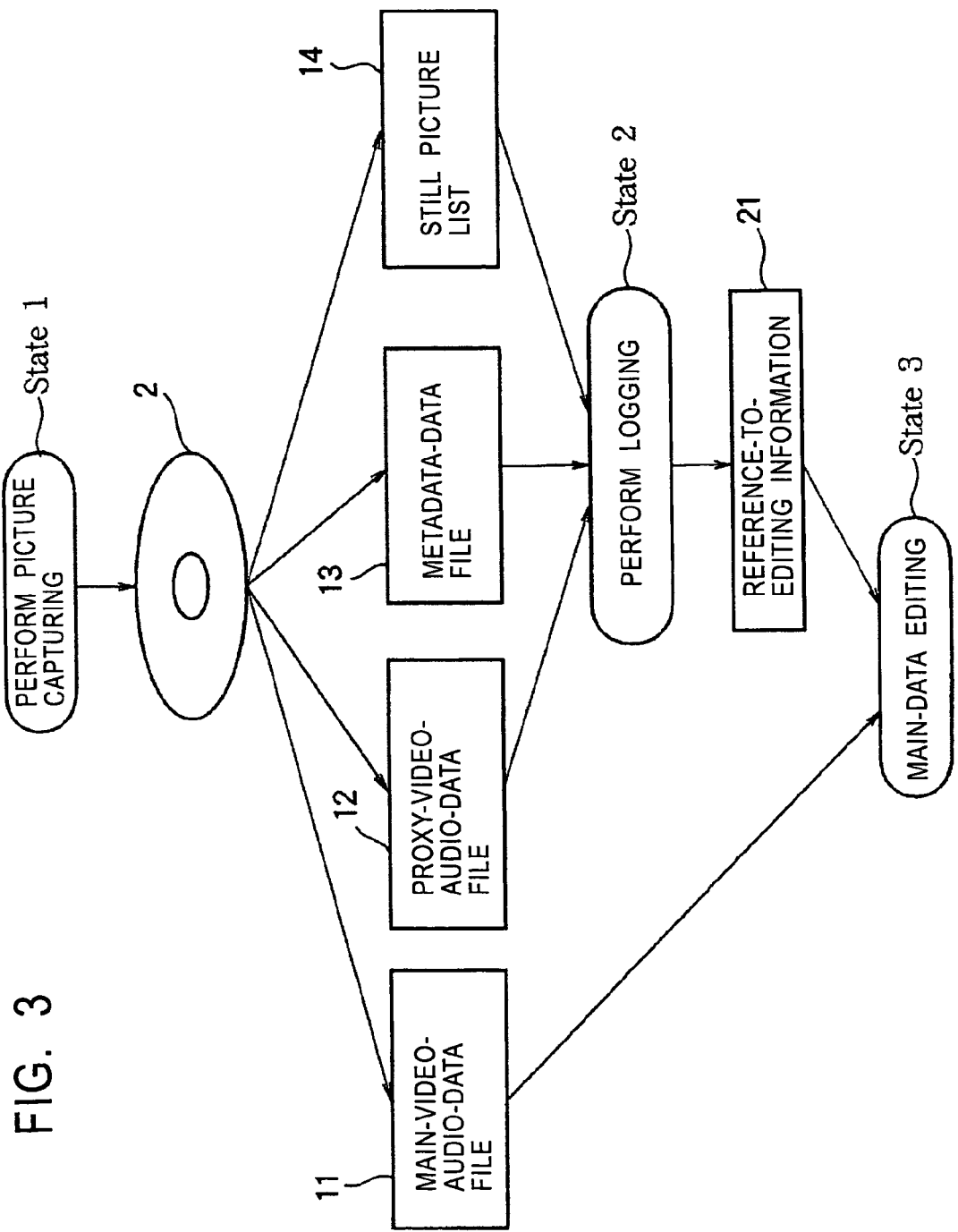
FIG. 3 is an illustration of data recorded on an optical disk, which contains captured data, and another example of editing the data.

The proxy video data and the proxy audio data are used as proxy editing data for the user of the optical disk apparatus 1, who is an editor, to perform proxy editing (FIG. 2) or to perform logging (FIG. 3). When it is not necessary to separate the proxy video data and the proxy audio data, both are hereinafter collectively referred to as "proxy data".

As FIG. 2 shows, the optical disk 2, which contains captured data, contains a main-video-audio-data file 11, a proxy-video-audio-data file 12, a metadata-data file 13, and a still picture list 14.

The main-video-audio-data file 11 is used to store high-recording-rate main video data and main audio data which are obtained by compressing, at a relatively low compression ratio, pictures and sound captured in a video camera.

The proxy-video-audio-data file 12 is used to store low-recording-rate proxy video data and proxy audio data which are obtained by compressing the main video data and the main audio data at a high compression ratio.

When the optical disk 2 is loaded into the optical disk apparatus 1 in a state in which it is set in an automatic copying mode (described later), the optical disk apparatus 1 copies the proxy-video-audio-data file 12 into a hard disk drive (HDD).

In connection with the copying of the proxy-video-audio-data file 12, the optical disk apparatus 1 also automatically copies the metadata-data file 13 and the still picture list 14, which concern the proxy-video-audio-data file 12, into the HDD.

After that, using the proxy video data and proxy audio data recorded on the HDD as material, proxy editing (State 2) is performed by a user.

For example, in the proxy editing, by using the proxy video data and the proxy audio data as material, from among one or at least two picture scenes, the picture scene or scenes required for final editing in a final process are selected. After an IN point and an OUT point are set on the selected picture scenes, an operation of extracting a range of pictures to be used is performed.

Edited information 15 as the result of the proxy editing is transmitted to an apparatus in an editing place where final editing of the main video data and the main audio data is performed, for example, through the Internet. The edited information 15 includes, for example, information representing an IN point and an OUT point which designate a range of use in broadcasting, etc.

At the same time, the main-video-audio-data file 11 is delivered to the editing place for performing the final editing, for example, with it recorded on the optical disk 2. After that, based on an editing result represented by the edited information 15, which is generated by the optical disk apparatus 1, main-data editing on the main-video-audio-data file 11 is performed (State 3) to create final and edited video data and audio data.

In this type of editing, the proxy video data and proxy audio data which are processed in the proxy editing by the optical disk apparatus 1 have a relatively low recording rate and less amount. Accordingly, the optical disk apparatus 1 does not need to have a processing capability similar to that of an apparatus performing final editing. Also, by using the optical disk apparatus 1, in an occasion such as a time just after picture capturing, simple editing can be performed on the spot.

For example, when, for example, the automatic copying mode is set, by only loading the optical disk 2 into the optical disk apparatus 1, the user, who performs proxy editing, can record the proxy-video-audio-data file 12, which is necessary in the proxy editing, and can record, in connection with the recording, the metadata-data file 13 and the still picture list 14 onto the HDD of the optical disk apparatus 1. Therefore, the proxy editing can be easily and quickly initiated. In other words, after loading the optical disk 2 into the optical disk apparatus 1, the user does not need to operate the optical disk apparatus 1 to select each file to capture.

The still picture list 14 is acquired from predetermined metadata described in the metadata-data file 13, as fully described later.

FIG. 3 shows an example of a flow of data, for example, in the case of performing the logging in of a picture-capturing place in stead of the above proxy editing. In the State 2 shown in FIG. 3, by using the proxy-video-audio-data file 12, metadata-data file 13, and still picture list 14 read from the optical disk 2 to the optical disk apparatus 1, logging is performed. The logging is an editing operation which is more simplified than the proxy editing. The editing operation includes simple selection of necessary picture scenes.

Reference-to-editing information 21 representing the result of logging is transmitted to the apparatus for performing final editing, for example, through a network. The transmitted reference-to-editing information 21 is used for reference in final editing (State 3) using main video data and main audio data as material.

As described above, in connection with copying of the proxy-video-audio-data file 12, the metadata-data file 13, which concerns the copying, is automatically copied. However, when only one file, the main-video-audio-data file 11, is recorded, in connection with copying the main-video-audio-data file 11, the metadata-data file 13, which concerns the copying, may be automatically copied. In other words, in connection with copying of one of the main-video-audio-data file 11 and the proxy-video-audio-data file 12, copying of the metadata-data file 13 may be automatically performed.

Figure 4:
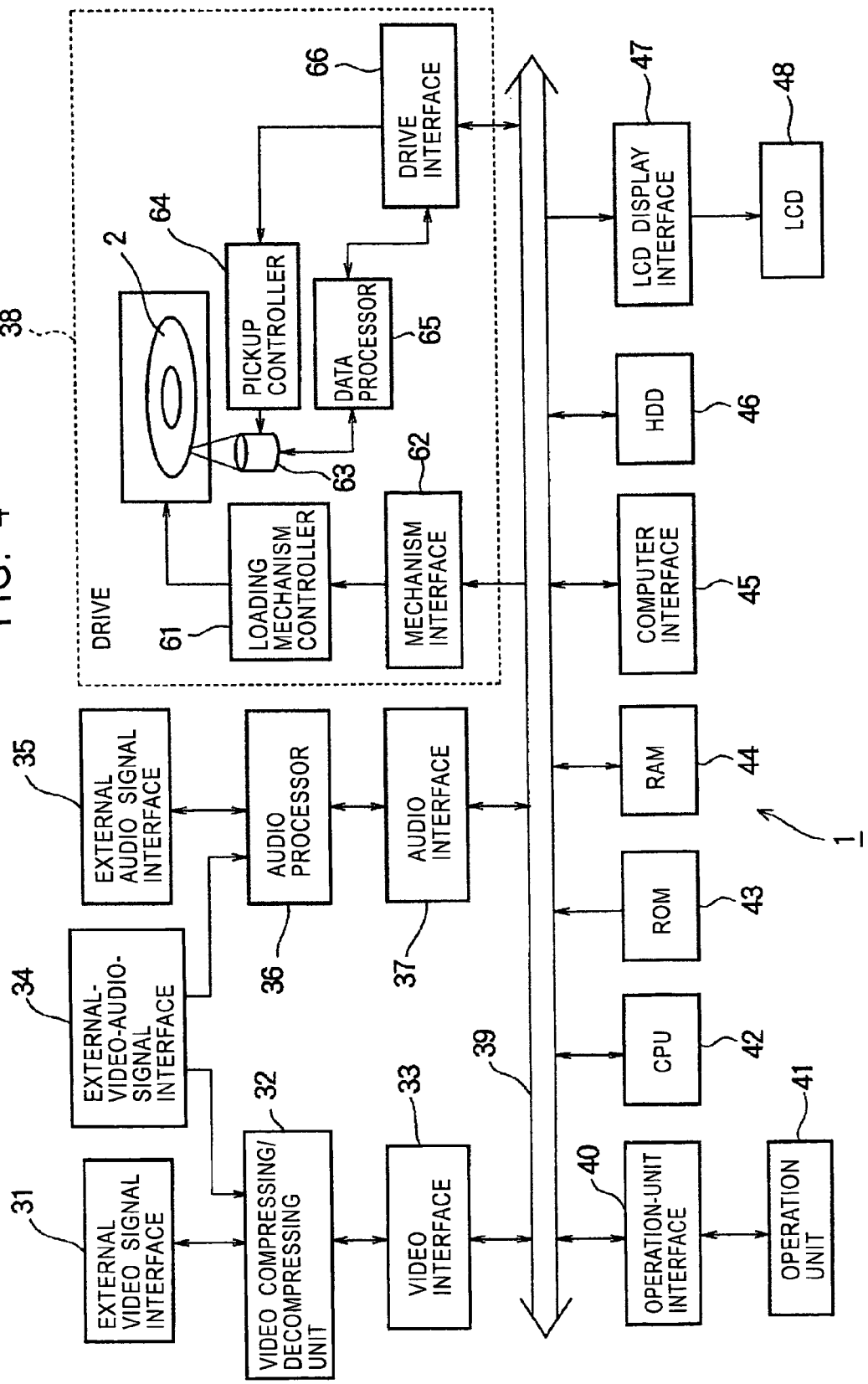
FIG. 4 is a block diagram showing an example of an optical disk apparatus.

FIG. 4 is a block diagram showing an example of the optical disk apparatus 1, which performs the above proxy editing and logging.

An external video signal interface 31 outputs, to a video compressing/decompressing unit 32, a video signal input from an external apparatus outside the optical disk apparatus 1, and also outputs, to the external apparatus, a video signal supplied from the video compressing/decompressing unit 32. The external video signal interface 31 includes, for example, an input/output unit for an analog composite signal and an analog component signal.

The video compressing/decompressing unit 32 converts the video signal supplied from the external video signal interface 31 or an external-video-audio-signal interface 34 into digital form, if needed. Subsequently, the video compressing/decompressing unit 32 compresses the converted video signal by using, for example, the MPEG-2 (Moving Picture Experts Group-2) standard, and outputs the obtained data to a bus 39 through a video interface 33. Also, the video compressing/decompressing unit 32 outputs, to the external video signal interface 31, a video signal obtained by performing decompression (decoding) and to-analog-form conversion on the video data supplied through the video interface 33. The video interface 33 performs data supply to the video compressing/decompressing unit 32, and performs data output from the video compressing/decompressing unit 32 to the bus 39.

The external-video-audio-signal interface 34 outputs, to the video compressing/decompressing unit 32, video data input from the external apparatus, and outputs, to an audio processor 36, audio data input from the external apparatus. Also, the external-video-audio-signal interface 34 outputs, to an external apparatus, video data supplied from the video compressing/decompressing unit 32 and audio data supplied from the audio processor 36. The external-video-audio-signal interface 34 is, for example, an interface complying with a standard such as an SDI (Serial Digital Interface) or an SDTI (Serial Date Transfer Interface).

An external audio signal interface 35 outputs, to the audio processor 36, the audio signal input from the external apparatus, and outputs, to the external apparatus, the audio signal supplied from the audio processor 36. The external audio signal interface 35 is, for example, an interface complying with the AES-EBU (Audio Engineering Society/European Broadcast Union) standard, which is an analog-audio-signal interface.

The audio processor 36 performs processing, such as digital-to-analog conversion and volume adjustment, on the audio data supplied from the audio interface 37, and outputs the obtained signal to the external audio signal interface 35. The audio processor 36 performs analog-to-digital conversion on the audio signal supplied from the external audio signal interface 35, and outputs the obtained data to an audio interface 37. The audio interface 37 performs data supply to the audio processor 36 and data output from the audio processor 36 to the bus 39.

A drive 38 includes a loading mechanism controller 61 for controlling loading of the optical disk 2, a mechanism interface 62 for performing data transmission and reception between the loading mechanism controller 61 and the bus 39, a pickup 63, a pickup controller 64 for controlling the generation of a laser beam from the pickup 63 and detection of reflected light, a data processor 65 which outputs, to the pickup 63, data to be recorded on the optical disk 2, and which acquires data from the reflected light of the laser beam, which is detected by the pickup 63, and a drive interface 66 for performing data transmission and reception between the data processor 65 and the bus 39.

An operation-unit interface 40 accepts an input operation of the user (editor) on an operation unit 41, and outputs a signal corresponding to the input operation to a central processing unit (CPU) 42.

The CPU 42 loads a control program recorded in a read-only memory (ROM) 43 into a random access memory (RAM) 44, and controls the entire operations of the optical disk apparatus 1. For example, when the optical disk 2 is loaded into the drive 38, the CPU 42 controls the units of the drive 38 to read proxy-video-audio-data file and metadata file recorded on the optical disk 2, and outputs the read data to the HDD 46.

By performing communication with a personal computer connected by, for example, a connecting cable such as an IEEE (Institute of Electrical and Electronics Engineers) 1394 cable, a USB (Universal Serial Bus) cable, a cross cable, or a straight cable, a computer interface 45 transfers various types of data to the personal computer.

Various types of data, such as the proxy-video-audio-data file and metadata file supplied through the bus 39 after being read from the optical disk 2, are recorded in the HDD 46. The data recorded in the HDD 46 is used in, for example, proxy editing.

A liquid-crystal-display (LCD) display interface 47 allows an LCD 48 to display video corresponding to the data supplied through the bus 39.

Figure 5:
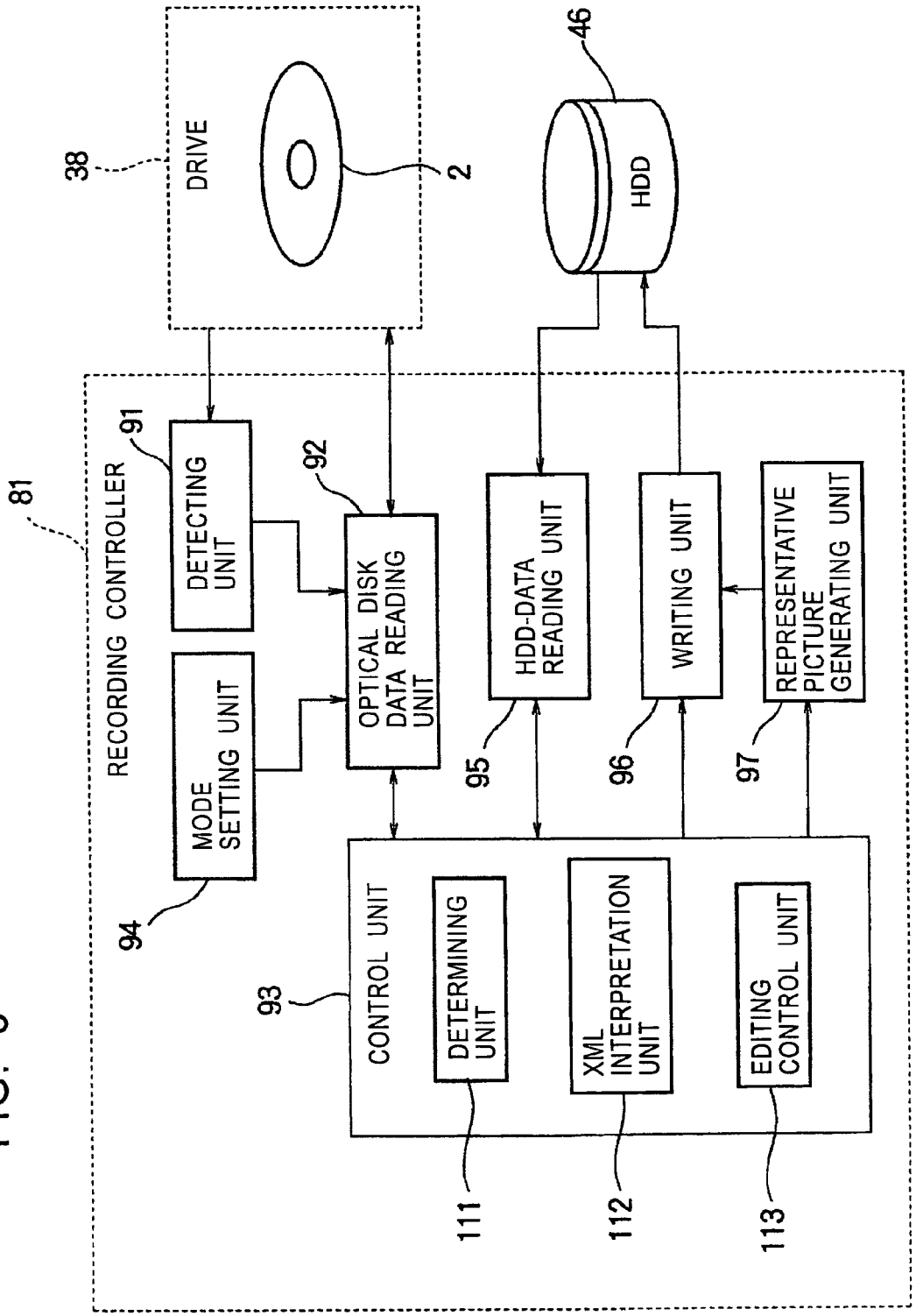
FIG. 5 is a block diagram of an example of the functional configuration of an optical disk apparatus.

FIG. 5 is a block diagram showing an example of a functional configuration realized by the optical disk apparatus 1 having the above-described configuration.

A recording controller 81 includes a detecting unit 91, an optical disk data reading unit 92, a control unit 93, a mode setting unit 94, an HDD-data reading unit 95, a writing unit 96, and a representative picture generating unit 97.

The detecting unit 91 detects a state in which the optical disk 2 is loaded into the drive 38, and outputs loading-representing information to the optical disk data reading unit 92.

For example, when a state in which the optical disk 2 is loaded into the drive 38 is detected by the detecting unit 91, for example, with the optical disk apparatus 1 set in the automatic copying mode, the optical disk data reading unit 92 reads a proxy-video-audio-data file and a metadata file from the optical disk 2, and outputs the files to the control unit 93. The automatic copying mode is switched on/off and set such that, for example, a predetermined manual switch is operated by the user.

Here, data recorded on the optical disk 2 is described below.

At first, terms relating to the data recorded on the optical disk 2 are described below.

"Metadata" is additional information concerning certain data such as video data, and is used in editing in order for the editor to confirm data content or to search for a predetermined frame. For example, a picture-capturing date and time, a picture-capturing place, various memoranda, etc., are added as metadata to video data or the like. The metadata includes, for example, clip metadata to be added for each piece of video data for one clip, and frame metadata to be added for each frame. At least part of the metadata recorded on the optical disk 2 is stored by the HDD 46 in the optical disk apparatus 1.

A "clip" is, for example, a consecutive picture interval from the start of recording to the end of recording by a video camera.

Figure 6:
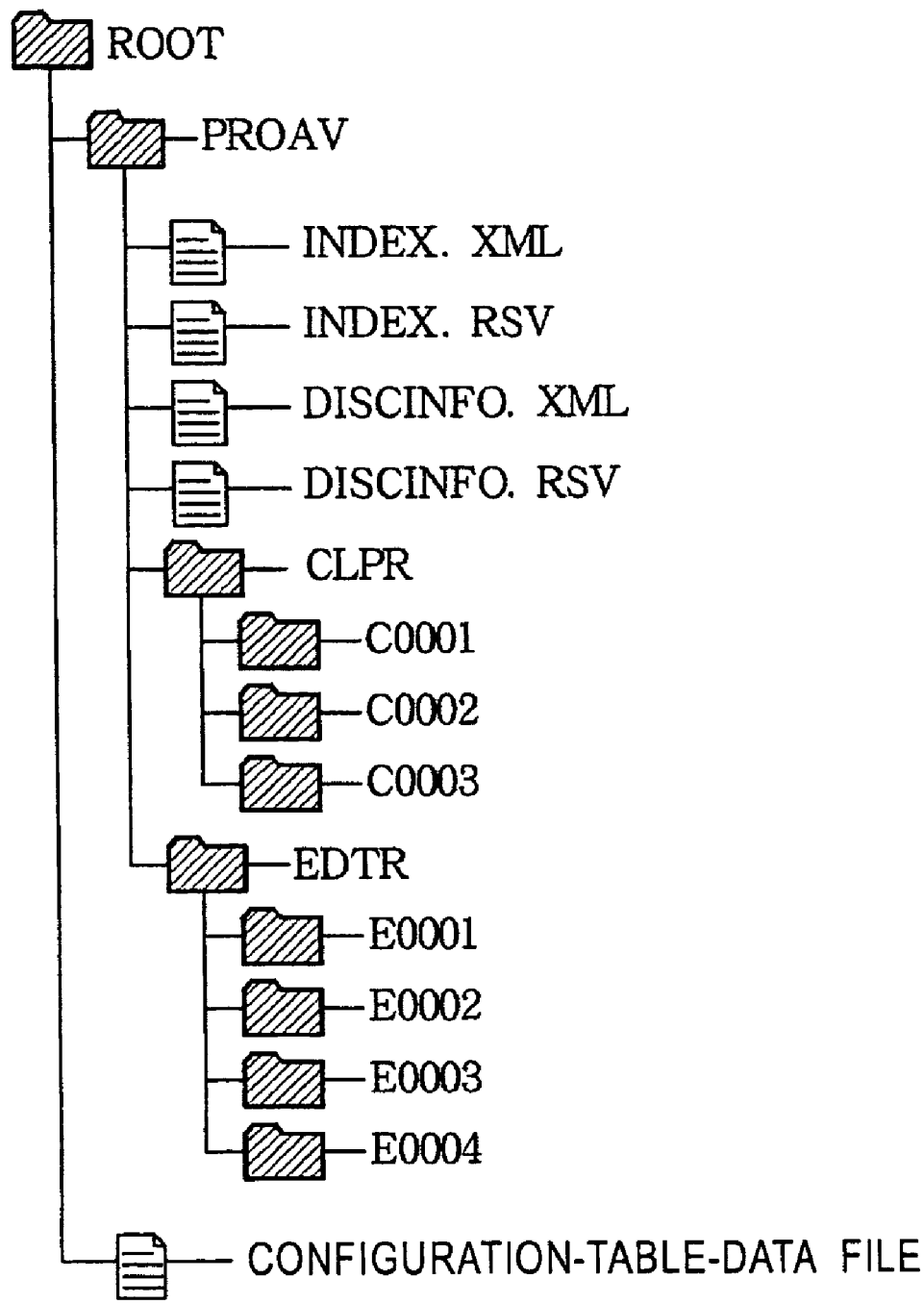
FIG. 6 is an illustration of directories of data recorded on an optical disk.

FIG. 6 shows the configurations of directories (folders) and files of data recorded on the optical disk 2.

As shown in FIG. 6, a ROOT directory stores a PROAV directory for storing video data corresponding to one program, and a configuration-table data file for storing metadata in the data of the PROAV directory.

The PROAV directory stores an index file (INDEX.XML), a file containing a copy of the index file, a disk information file (DISCINFO.XML), and a file (DISCINFO.RSV) containing a copy of the disk information file.

The index file is used to manage recorded clips and an editing list for the entirety of the optical disk 2, and is described in, for example, an Extensible Markup Language-based (XML-based) language. The disk information file describes attributes, playback-start position, etc., of the optical disk 2.

The PROAV directory also stores a clip directory (CLPR) and an edit directory (EDTR).

The clip directory stores directories corresponding to clips. The edit directory stores the order that video data and audio data are played back, and data of an edit list representing a playback range. The edit list contains information representing an IN point and an OUT point which are set for each clip. A plurality of edit lists may be added for one clip.

Figure 7:
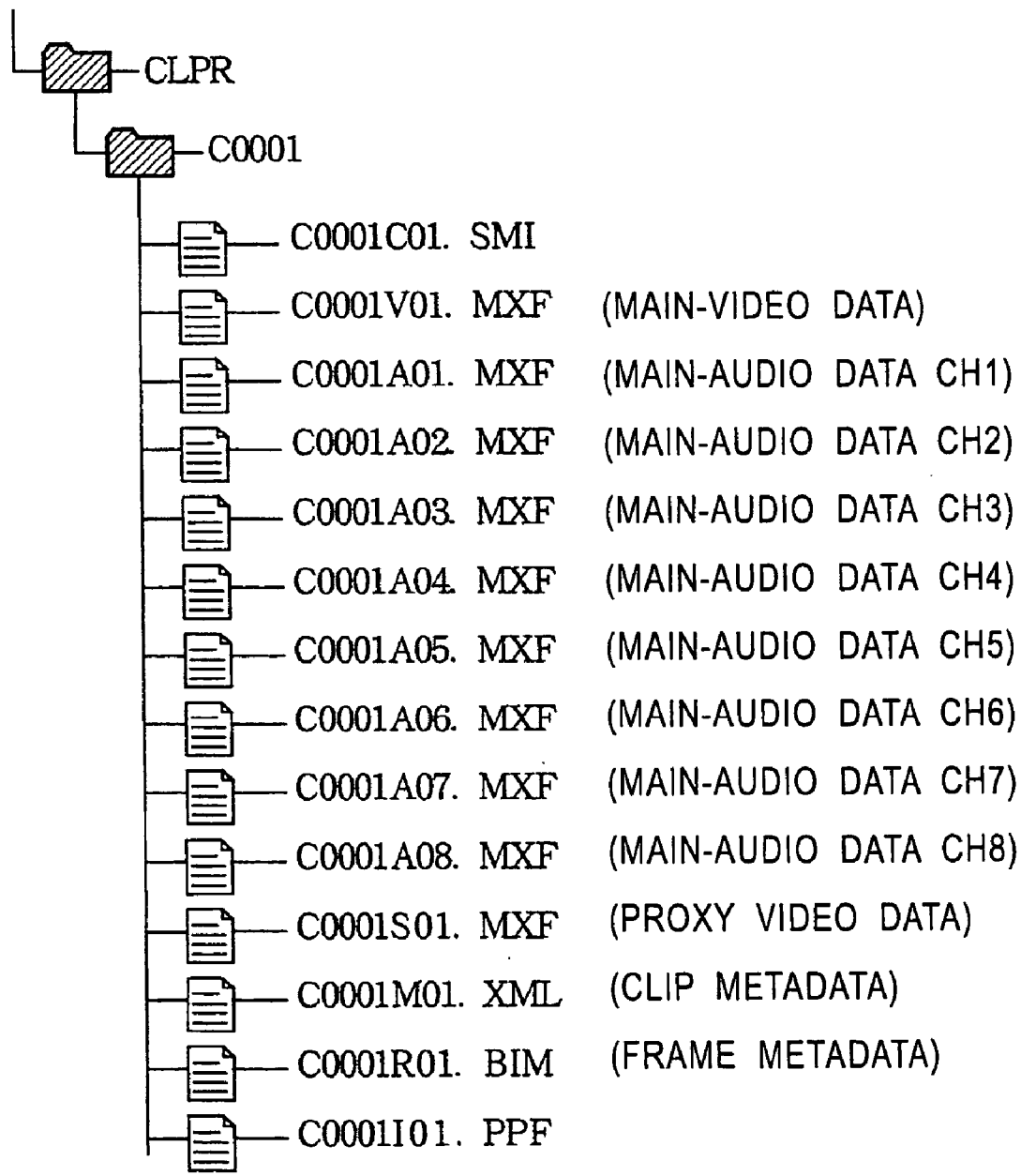
FIG. 7 is an illustration of examples of files recorded in the "C0001" directory shown in FIG. 6.

FIG. 7 shows examples of files stored in one clip directory (the "C0001" directory shown in FIG. 6). In FIG. 7, the parenthesized portion on the right of each file represents the content of the file, and is not included in the file name. The "C0001C01.SMI" file (shown in FIG. 7) at the start of the clip directory describes information concerning playback of one set of multimedia objects (video or audio objects), a layout on a screen, or a link to other multimedia objects.

This file is described in, for example, the synchronized multimedia Integration Language (SMIL).

The "C0001V01.MXF" file stores main video data.

The "C0001A01.MXF" to "C0001A08.MXF" files store main audio data. In each file, 1-channel audio data is recorded.

The "C0001S01.MXF" file stores proxy video data. In other words, the proxy video data stored is low-recording-rate data obtained by compressing the main video data stored in the "C001V01.MXF" file at a higher compression ratio.

The "C0001M01.XML" file is described in an XML-based language and stores clip metadata added to the above clip (the "C0001" clip).

The clip metadata includes frame-characteristic information, that is, an essence mark which is set for a predetermined frame included in video data in an occasion such as picture capturing or subsequent simple editing.

For example, the essence mark indicates that a frame with the essence mark set therein is a frame in which picture capturing starts, a frame in which picture capturing ends, a frame in which a sound volume larger than a predetermined threshold value is detected in picture capturing, a frame in which a flash is used in picture capturing, etc. The essence mark is used, for example, when the editor specifies a certain frame in editing.

Also, the clip metadata includes a still picture list that is a list of information, such as time codes. The still picture list is used to designate frames representing the clip.

For example, in editing, which is performed later, the frames designated on the still picture list are displayed in the form of a list on the editing screen, whereby the editor can easily understand the content of the clip. The frames designated on the still picture list include, for example, a frame at the start of the clip, and a frame with an essence mark set therein.

The "C0001R01.BIM" file stores frame metadata set for each frame of this clip. In this example, the frame metadata is described in the binary format for metadata (BIM) in which an XML file is converted into binary form. As described above, the frame metadata is described in a file different from that of the clip metadata. Therefore, the data required for editing can be specified in units of files in such a manner that only clip metadata or only frame metadata is specified.

The frame metadata includes, for example, linear time code (LTC) information, user bit information, unique material identifier (UMID) information, and global positioning system (GPS) information.

The LTC uses predetermined time information, such as a year, month, day, time, minutes, and seconds, to characterize video data in a frame in which the frame metadata is set.

The user bit represents a signal characteristic of a picture signal of the frame.

The UMID is a worldwide unique identification set in data to be referred to.

The GPS information represents a place where picture capturing is performed by using a video camera.

The "C0001I01.PPF" file contains information concerning a frame structure.

Referring back to FIG. 5, the optical disk data reading unit 92 reads, from the optical disk 2, which contains various types of data in the above-described structure, for example, the "C0001S01.MXF" file in FIG. 7, which is a proxy video data file, and the "C0001M01.XML" file, which is a clip metadata file. As described above, the clip metadata file also includes the still picture list.

Also the file and index file (FIG. 6) which store the proxy audio data to be recorded on the optical disk 2 and obtained by compressing the main audio data at a high compression ratio are read by the optical disk data reading unit 92, if needed.

The data read by the optical disk data reading unit 92 is output to the control unit 93.

Based on the index file supplied from the optical disk data reading unit 92, and data supplied from the HDD-data reading unit 95, a determining unit 111 in the control unit 93 determines whether the proxy data recorded on the optical disk 2 is also recorded in the HDD 46. If the determining unit 111 has determined that the proxy data recorded on the optical disk 2 is not recorded in the HDD 46, it controls the optical disk data reading unit 92 to read the proxy data. The proxy data read is output from the control unit 93 to the writing unit 96 and is stored in the HDD 46.

Metadata, such as clip metadata and frame metadata to be used later in editing, is output from the control unit 93 to the writing unit 96, and is recorded in the HDD 46, together with the proxy data.

An XML interpretation unit 112 in the control unit 93 interprets a file which is read from the optical disk 2 and which is described in the XML-based language, and outputs the result of interpretation to the writing unit 96 and the representative picture generating unit 97. As described above, the clip metadata file including the still picture list is described in an XML-based language (FIG. 7). Based on the result of interpretation, a representative picture is generated by the representative picture generating unit 97.

An editing control unit 113 in the control unit 93 edits the proxy data (proxy editing) in response to a user's operation.

The mode setting unit 94 sets the automatic copying mode or cancels the set mode, and outputs, to the optical disk data reading unit 92, information representing the setting state. When the automatic copying mode is cancelled, it may be that the manual mode is set because manual copying of proxy data can be performed.

The HDD-data reading unit 95 reads data recorded in the HDD 46, and outputs, for example, information (management information such as the index file) managing the data recorded in the HDD 46, to the control unit 93.

The writing unit 96 writes, in the HDD 46, various types of data for use in editing, such as proxy data supplied through the control unit 93, the result of interpreting a file described in the XML-based language, and a representative picture generated by the representative picture generating unit 97.

Based on the proxy data recorded in the HDD 46, the representative picture generating unit 97 acquires frames designated on the still picture list, and data (data of part of video) of frames having essence marks set, and generates a representative picture by using the JPEG (Joint Photographic Experts Group) standard to compress the acquired data. Data of the representative picture generated by the representative picture generating unit 97 is output to the writing unit 96. The representative picture may be generated based on the main video data. For example, when the representative picture is generated based on the main video data, its frame data is read by the optical disk data reading unit 92, and is output to the representative picture generating unit 97.

The representative picture is not limited to a still picture. For example, video obtained from proxy data for a period, such as several seconds, may be displayed as the representative picture on the editing screen.

Next, the operation of the optical disk apparatus 1, which has the above-described configuration, is described below.

At first, a process of the optical disk apparatus 1 which copies data recorded on the optical disk 2 into the (built-in) HDD 46 is described below with reference to the flowcharts shown in FIGS. 8 and 9.

This process is started when the detecting unit 91 detects a state in which the optical disk 2 (used for picture capturing) is loaded into the drive 38.

In step S1, when the detecting unit 91 detects the state in which the optical disk 2 is loaded into the drive 38, based on an output from the mode setting unit 94, the optical disk data reading unit 92 determines whether the automatic copying mode is set.

If the optical disk data reading unit 92 has determined in step S1 that the automatic copying mode is not set, the process ends. Alternatively, if it has determined that the automatic copying mode is set, it proceeds to step S2.

In step S2, the optical disk data reading unit 92 reads an index file (e.g., the "INDEX.XML" file shown in FIG. 6) recorded on the optical disk 2. As described above, the index file read in step S2 contains information managing the data recorded on the optical disk 2. The index file is output to the control unit 93, and its description is interpreted by the XML interpretation unit 112.

Here, after reading the configuration-table data file and edit list file in FIG. 6 (e.g., the files below the "EDTR" directory shown in FIG. 6), if needed, based on information described in the above files, a range of proxy data read from the optical disk 2 may be determined. For example, when an IN point and an OUT point are described on the edit list as the result of simple editing by another apparatus, only proxy data in the range designated on that edit list is read through reading processing (e.g., step S8), which is described later.

In step S3, the HDD-data reading unit 95 reads the index file that is information managing the data recorded in the HDD 46. For example, similarly to the case of the optical disk 2, the HDD 46 also has a recorded index file which manages recorded proxy files, a file name of meta data, an updating date and time, etc. The index file read by the HDD-data reading unit 95 is output to the control unit 93.

In step S4, by referring to the result of interpretation by the determining unit 111 of the index file read from the optical disk 2, the determining unit 111 sets "1" to variable N representing a clip on which determination is to be performed.

In step S5, by referring to the index file, the determining unit 111 acquires the file name, and updating date and time of a proxy file in the N-th (in the case of a step performed consecutively from step S4, the first) clip recorded on the optical disk 2.

By way of example, as shown in FIG. 6, when the clip directory stores the "C0001" to "C0003" folders, a clip with the name "C0001" set therein is used as the first clip is subject to determination. The file name "C0001S01.MXF" (shown in FIG. 7) of a file which is stored in the "C0001" directory and which stores proxy data, and an updating date and time (time stamp) added to the file are acquired from the index file.

Based on the index file read from the HDD 46 in step S3, in step S6, the determining unit 111 determines whether the proxy file having the file name, and updating date and time read in step S5, have already been recorded in the HDD 46. Specifically, the index file read from the HDD 46 contains the file name, and updating date and time of the proxy file already recorded in the HDD 46. Accordingly, the determining unit 111 determines whether the read file name and updating date and time match the file name and updating date and time read from the optical disk 2.

If the determining unit 111 has determined in step S6 that the proxy file having the file name and updating date and time read from the optical disk 2 are recorded in the HDD 46, it proceeds to step S7. In step S7, the determining unit 111 sets variable N to increment by one, and subsequently returns to step S5 and executes the subsequent processing.

Therefore, when "1" is set to variable N, and a clip in which the name "C0001" is set is subject to determination, next, "2" is set to variable N, a clip in which the name "C0002" corresponding to the set value is subject to determination, and processing in step S5 and thereafter is performed.

Alternatively, if the determining unit 111 has determined in step S6 that the proxy file having the file name and updating date and time read from the optical disk 2 are not recorded in the HDD 46, or, although there is an identical file name, its updating date and time differ, the determining unit 111 proceeds to step S8 and controls the optical disk data reading unit 92 to read the proxy file and metadata file (a clip metadata file and a frame metadata file) in the N-th clip.

Accordingly, when "1" is set to variable N, and a clip having the name "C0001" is subject to determination, the "C0001S01.MXF" file shown in FIG. 7, which is a proxy file in that clip, the "C0001M01.XML" file in FIG. 7, which is a clip metadata file, and the "C0001R01.BIM" file, which is a frame metadata file, are read.

The read proxy file and metadata file are output to the writing unit 96 through the control unit 93. In step S9, the output files are written (recorded) in the HDD 46 by the writing unit 96. In addition, at this time, also the index file which manages the data recorded in the HDD 46 is updated, and information concerning the additionally written proxy file and metadata file, such as file names, and updating dates and times, is registered in the index file. In the proxy file recorded in the HDD 46, proxy video data is also output to the representative picture generating unit 97.

This records, in the HDD 46, the proxy file and metadata file which are not recorded in the HDD 46, or the newly updated proxy file and metadata file, without designating any files by the user himself or herself.

In step S10, the XML interpretation unit 112 in the control unit 93 controls the HDD-data reading unit 95 to read clip metadata file among the metadata files recorded in the HDD 46. The XML interpretation unit 112 interprets the read clip metadata, and acquires an essence mark and a still picture list. As described above, the clip metadata, which is described in an XML-based language includes an essence mark which is set in a predetermined frame in picture capturing or simple editing after the picture capturing, and which represents a feature of the frame, and a still picture list indicating that a frame at the start of each clip is a representative picture.

In step S11, the XML interpretation unit 112 outputs, to the writing unit 96, a metadata file (the result of interpretation) converted into a file format processible even by another apparatus, and records the output metadata file in the HDD 46.

As described above, when the optical disk 2 is loaded into the optical disk apparatus 1, a file which is described in a language requiring interpretation before processing, such as an XML-based language, is automatically interpreted, and the result of interpretation is recorded in the HDD 46. Thus, when actually initiating editing, the metadata does not need to be interpreted. In other words, compared with a case in which, after the metadata is interpreted when editing is ordered to start and the interpretation ends, editing using the metadata is performed, the user can start editing quicker for the time required for interpretation by the optical disk apparatus 1.

Information concerning the essence mark and still picture list interpreted by the XML interpretation unit 112 is supplied to the representative picture generating unit 97.

In step S12, based on the information (concerning the essence mark and still picture list) supplied from the XML interpretation unit 112, the representative picture generating unit 97 decodes, in the proxy video data (formed by groups of pictures (GOPs)) supplied from the control unit 93, a GOP including the start frame of a clip, and a GOP including a frame in which an essence mark is set. In other words, the representative picture generating unit 97 decodes, from, for example, proxy video data encoded in the MPEG-2 standard, GOPs including the start frame of a clip and a frame in which an essence mark is set so that each frame can be stored as still pictures.

In step S13, the representative picture generating unit 97 acquires, from data obtained by decoding in step S12, data of only the start frame of the clip or data of only the frame in which an essence mark is set, and generates a representative picture by performing JPEG compression on the data. The generated representative picture data is output to the writing unit 96 and is recorded in the HDD 46 in step S14.

As described above, the representative picture is created beforehand and is stored in the HDD 46. Accordingly, when the optical disk apparatus 1 is instructed to initiate editing, it generates the representative picture based on the data recorded in the HDD 46. Compared with the case of displaying a list of representative pictures on the editing screen, a list of representative picture can be displayed on the editing screen more quickly for the time required for generating the representative pictures. In other words, the user can quickly initiate editing on the editing screen, with the list of representative pictures displayed thereon.

The representative pictures are not limited to those generated in the above-described method. For example, when picture types (intra-pictures (I pictures), predictive (P) pictures, and bidirectionally predictive (B) pictures) of frames are described in a predetermined file, and the file indicates that a frame in which an essence mark is set is an I picture, the representative picture generating unit 97 uses the data of the frame as representative picture data without decoding the entirety of the GOP. In other words, since an I picture has a form intra-encoded without referring to another picture, when a frame whose picture type is an I picture is used as a representative picture, it is not necessary for the entirety of the GOP to be decoded.

In step S15, the determining unit 111 determines whether recording of proxy files and metadata files of all the clips recorded on the optical disk 2, and creating of representative pictures of the clips have ended. If the determining unit 111 has determined that the recording and the creating have not ended yet, it returns to step S5 and repeatedly performs subsequent processing. In other words, a clip to be processed is switched, and recording in the HDD 46 of a proxy file and metadata file of a new clip to be processed, and creating of a representative picture of the clip are performed.

Alternatively, if the determining unit 111 has determined that the recording and creating have ended for all the clips recorded on the optical disk 2, the copying process ends.

The above copying process is performed whenever the optical disk 2 is loaded. Accordingly, even if the user uses optical disks 2 in picture capturing, the user only loads each optical disk into the optical disk apparatus 1 in a sequential manner, whereby the optical disk apparatus 1 can automatically capture files, such as a proxy file and a metadata file.

Figure 8:
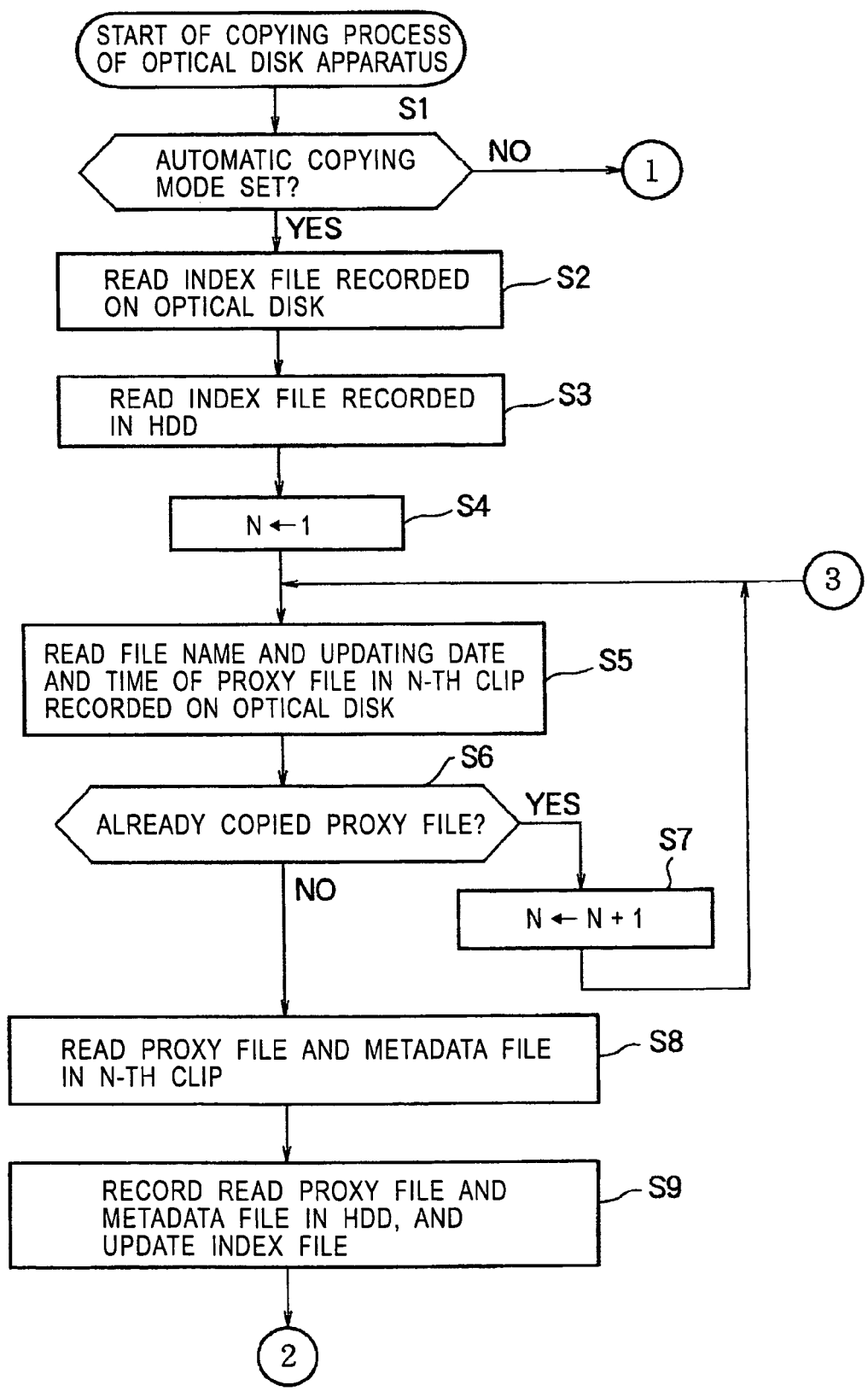
FIG. 8 is a flowchart illustrating a copying process of an optical disk apparatus.
Figure 9:
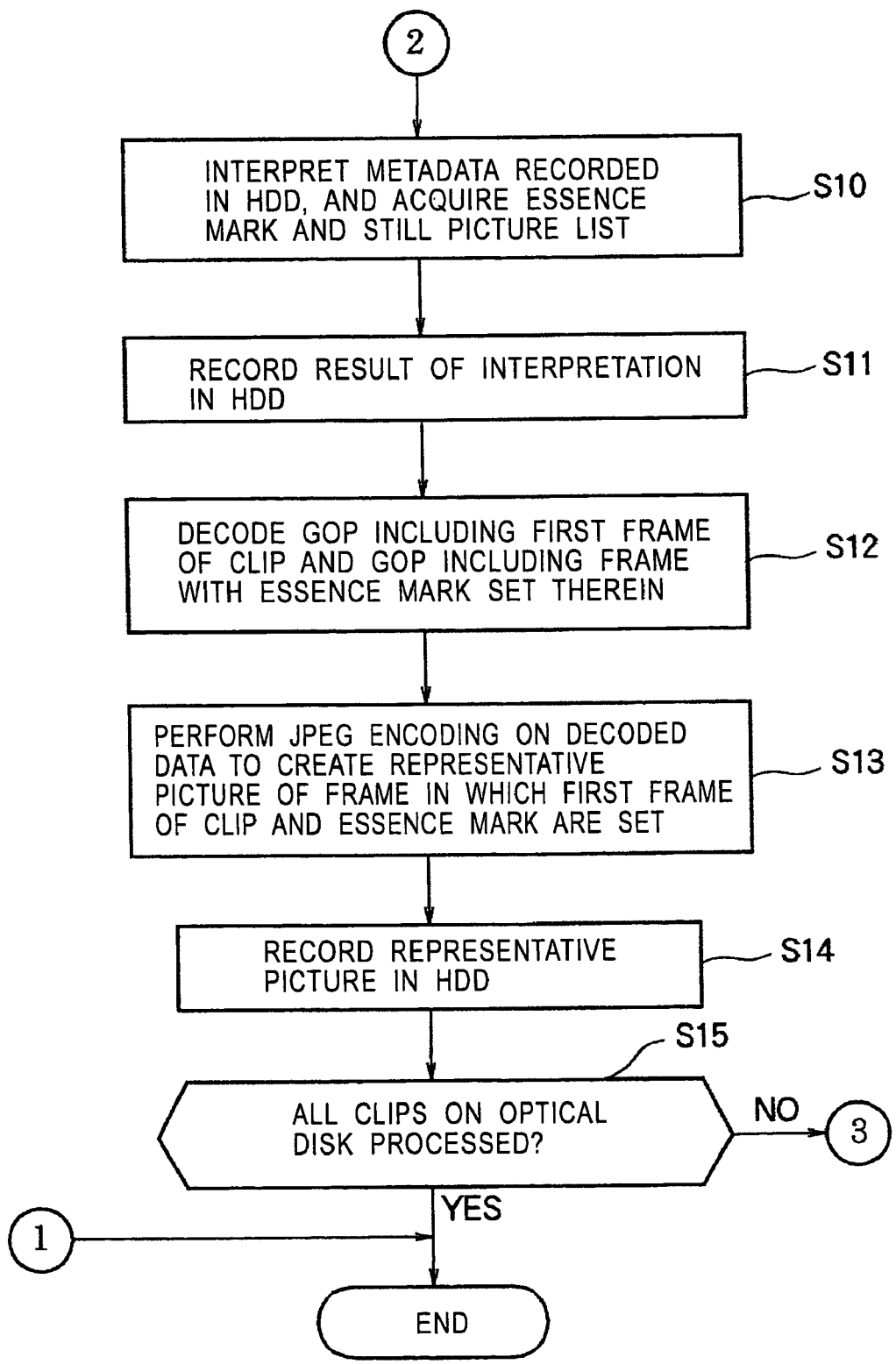
FIG. 9 is a flowchart continued from the flowchart in FIG. 8, which illustrates the copying process of the optical disk apparatus.

An editing process of the optical disk apparatus 1 which is performed on proxy files recorded in the HDD 46 by the process described with reference to FIGS. 8 and 9 is described below with reference to the flowchart shown in FIG. 10.

When the optical disk apparatus 1 is instructed to initiate editing, in step S31, the editing control unit 113 controls the HDD-data reading unit 95 to read representative picture data from the HDD 46, and displays a list of representative pictures based on the acquired data in a predetermined area on an editing screen. This enables the user, who performs editing, to confirm the start frame of a clip and a frame in which an essence mark is set. Accordingly, the user can understand the content of video in the proxy files recorded in the HDD 46.

Also, after the optical disk apparatus 1 is instructed to initiate editing, representative pictures are created. Compared with the case of displaying the list of representative pictures, the user can initiate editing more quickly.

In step S32, the editing control unit 113 edits proxy data in response to a user's instruction. For example, the editing control unit 113 performs processing, such as setting of an IN point and an OUT point in proxy data, and setting of an essence mark. This editing uses interpreted metadata which is recorded in the HDD 46 with the proxy data in the above-described processing. The result of editing by the editing control unit 113 is reflected in proxy data and metadata recorded in the HDD 46, if needed.

In step S33, the editing control unit 113 determines whether the optical disk apparatus 1 has been instructed to end the editing by the user. If the editing control unit 113 has determined that the optical disk apparatus 1 has not been instructed, it returns to step S32 and repeatedly performs editing in response to a user's instruction.

Alternatively, if the editing control unit 113 has determined that the optical disk apparatus 1 has been instructed to end the editing, the editing process ends.

Information (the edited information 15 in FIG. 2) created in the above editing process which represents the result of editing is transmitted to, for example, an apparatus for editing main data through a network. After that, based on the information which represents the result of editing, the main data is edited.

In the foregoing, when the optical disk 2 is loaded, with the automatic copying mode set, the proxy file, the metadata file, etc., are automatically captured by the optical disk apparatus 1. However, obviously, with the optical disk 2 loaded into the optical disk apparatus 1, capturing of the data may be performed in response to a user's instruction.

Figure 11:
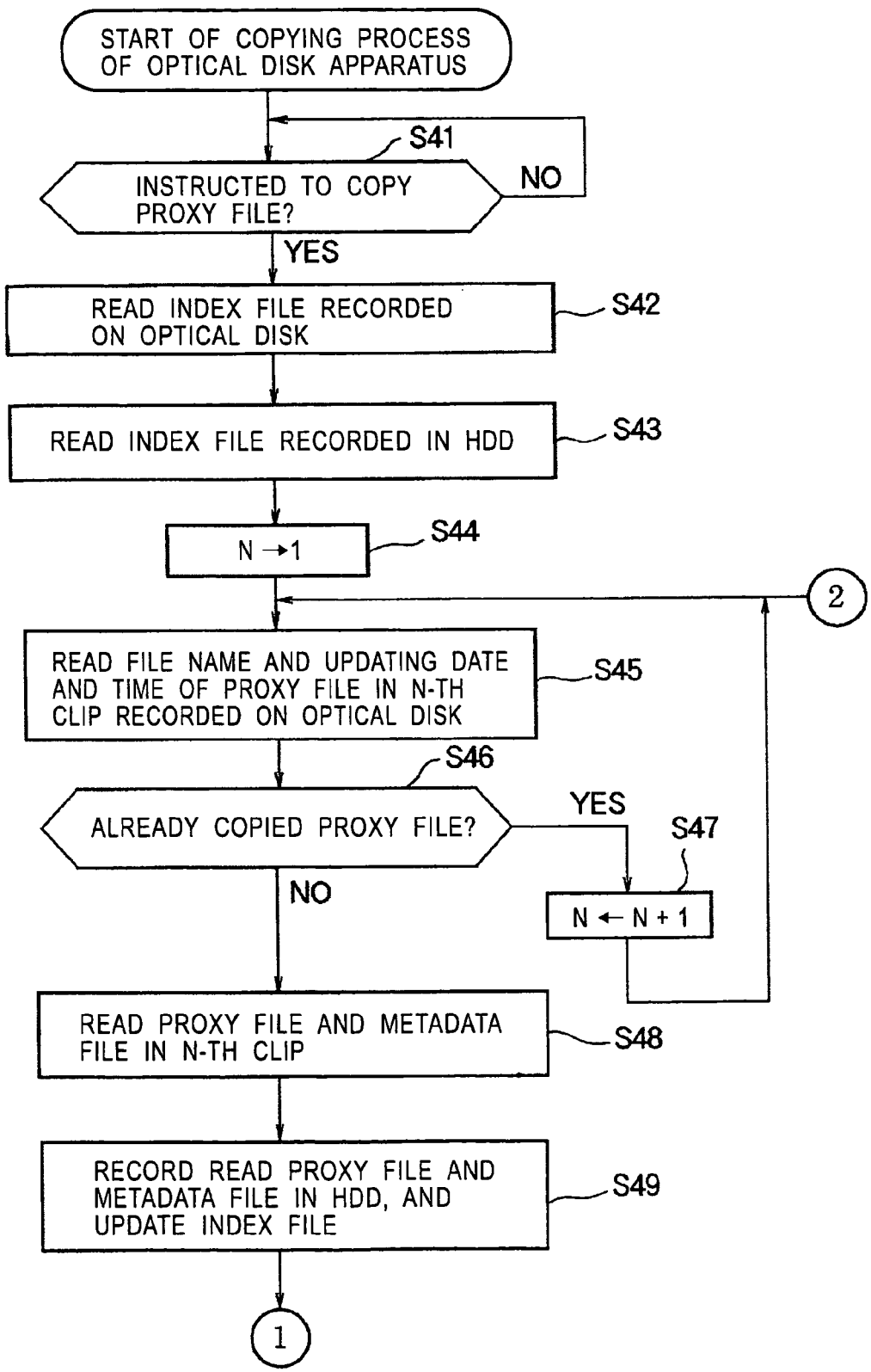
FIG. 11 is a flowchart illustrating another copying process of an optical disk apparatus.
Figure 12:
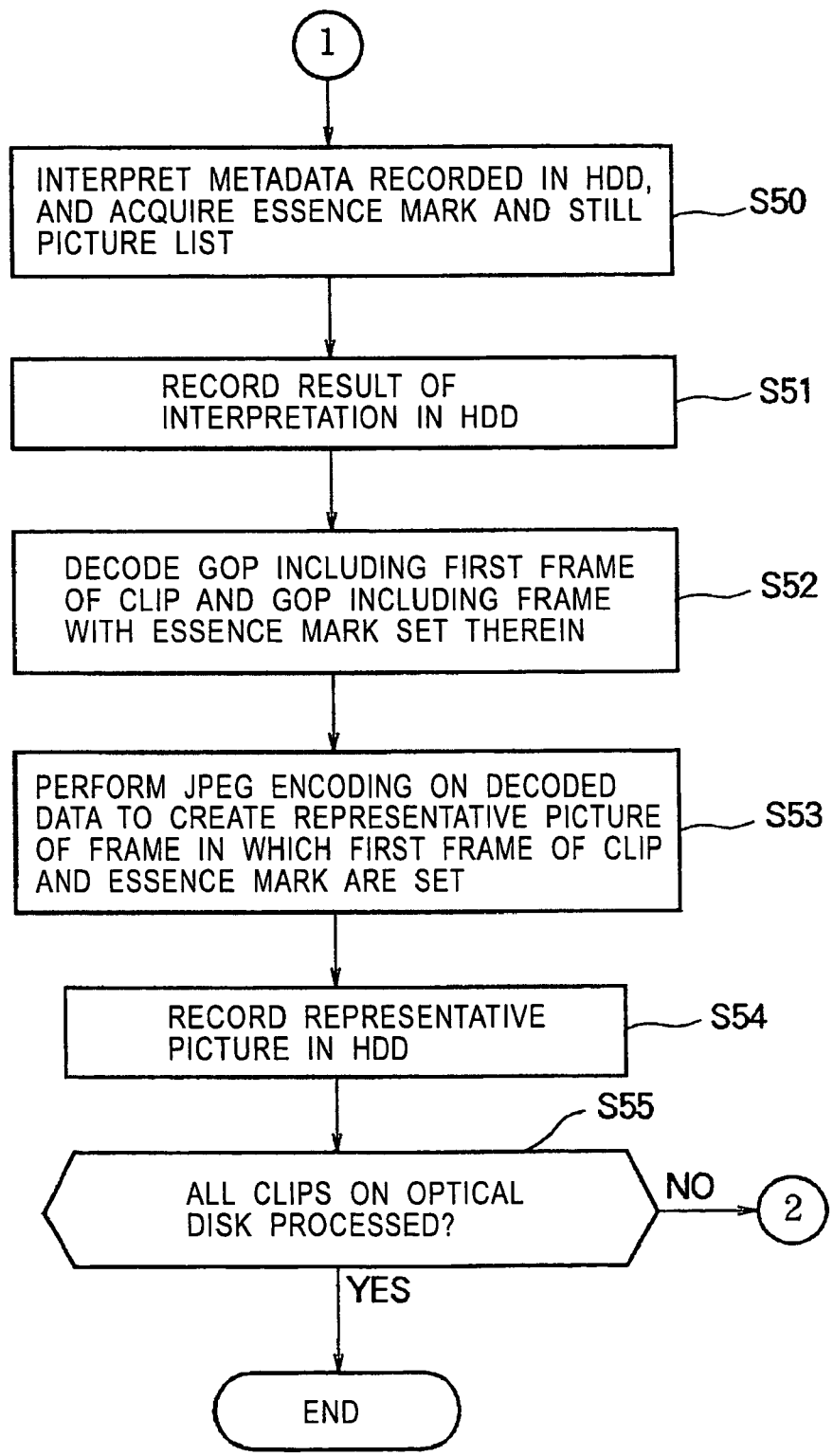
FIG. 12 is a flowchart continued from the flowchart shown in FIG. 11, which illustrates the copying process of the optical disk apparatus.

Next, a process by the optical disk apparatus 1 of copying (recording in the HDD 46) a proxy file, a metadata file, or the like, in response to a user's instruction is described below with reference to the flowcharts shown in FIGS. 11 and 12.

In step S41, the optical disk data reading unit 92 determines whether the optical disk apparatus 1 is instructed to copy a proxy file recorded on the optical disk 2 loaded into the drive 38. The optical disk data reading unit 92 is on standby until it determines that the optical disk apparatus 1 is instructed.

The operation unit 41 for the optical disk apparatus 1 is provided with, for example, a manual copying-start button which is operated when the user instructs the optical disk apparatus 1 to start copying. When an operation on the copying-start button by the user allows the optical disk data reading unit 92 to determine that the optical disk apparatus 1 is instructed to start copying, the optical disk data reading unit 92 proceeds to step S42.

Processing in step S42 and thereafter is similar to that in step S2 and thereafter which has been described with reference to FIGS. 8 and 9. In other words, in step S44, each predetermined clip is sequentially subject to processing, and in step S46, it is determined whether a proxy file in the clip has already been recorded in the HDD 46. Also, a proxy file and metadata file unrecorded in the HDD 46, and a representative picture, or the like, created based thereon are recorded in the HDD 46 (in steps S49 and S54). If it is determined in step S55 that, for all the clips, storing of proxy files, etc., has ended, the process ends.

As described above, also by starting copying when operating the copying-start button, the user can easily record a predetermined file, which is used in subsequent editing, in the HDD 46 of the optical disk apparatus 1, without selecting any files.

Figure 10:
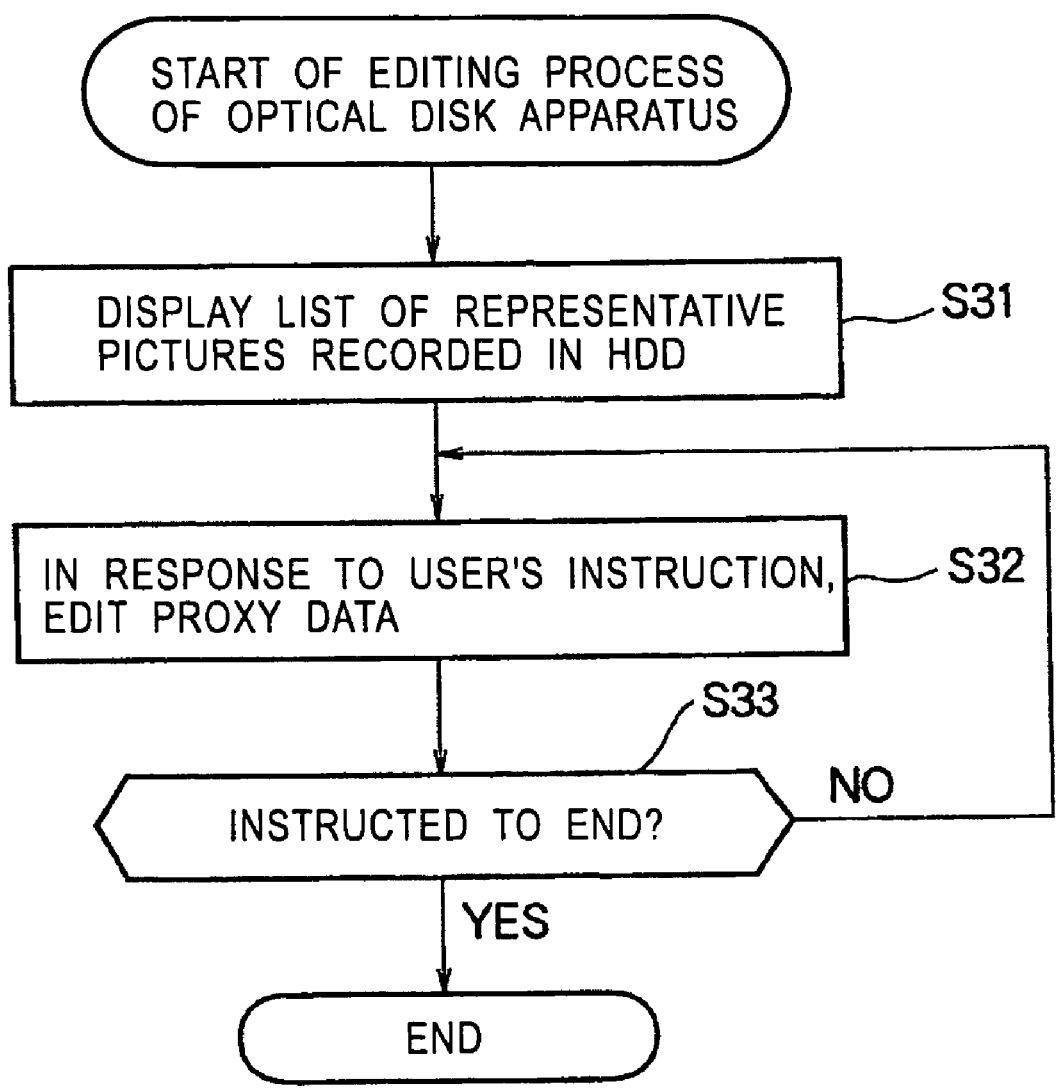
FIG. 10 is a flowchart illustrating an editing process of an optical disk apparatus.

In the optical disk apparatus 1, in which data for use in editing is recorded as described above, the editing process, described with reference to FIG. 10, is performed.

Figure 13A:
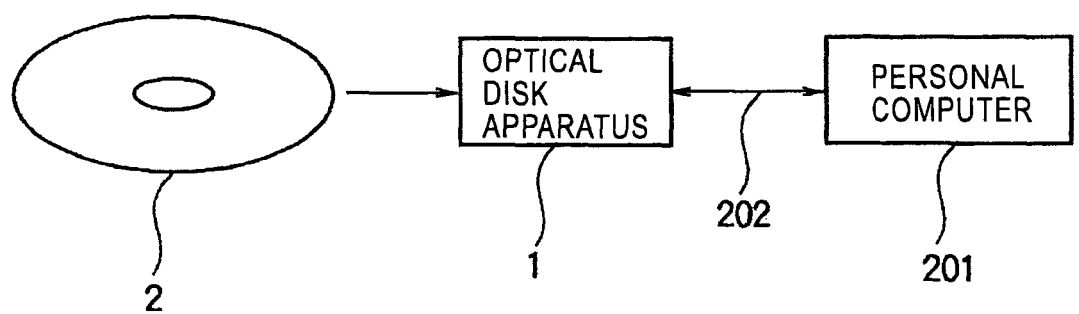
FIGS. 13A and 13B are block diagrams showing copying systems to which the present invention is applied.
Figure 13B:
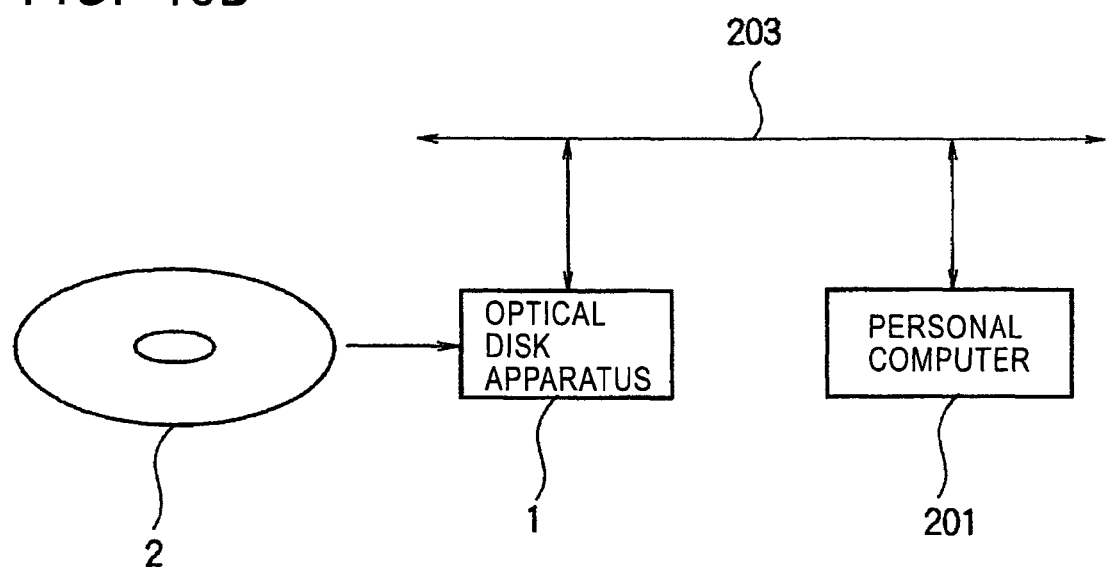

FIGS. 13A and 13B show examples of a copying system to which the present invention is applied.

Referring to FIG. 13A, an optical disk apparatus 1 and a personal computer 201 are connected through, for example, a cable (communication path) such as a cross cable, an IEEE 1394 cable, or a universal serial bus (USB) cable.

Similarly to the case of the above single optical disk apparatus 1, the personal computer 201 is provided with an automatic copying function in which, when the optical disk 2 is loaded into the optical disk apparatus 1, files recorded on the optical disk 2, such as a proxy file and a clip metadata file, are automatically stored in a built-in HDD.

When the optical disk 2 is loaded into the optical disk apparatus 1, which is connected through the cable 202, with the automatic copying mode set therein, the personal computer 201 controls the optical disk apparatus 1 to read files recorded on the optical disk 2, such as a proxy file and a metadata file, and acquires the read data through the cable 202 in accordance with a protocol such as TCP/IP (Transmission Control Protocol/Internet Protocol) or FTP (File Transfer Protocol). The personal computer 201 records the data in a built-in HDD. The data recorded in the HDD is used in editing performed by the user. Accordingly, in this example, editing is performed by the user in the personal computer 201, but is not performed in the optical disk apparatus 1.

Referring to FIG. 13B, the optical disk apparatus 1 and the personal computer 201 are connected to each other through a network 203 such as a local area network (LAN) which is a communication path.

Also in FIG. 13B, similarly to the case of FIG. 13A, when the optical disk 2 is loaded into the optical disk apparatus 1, files recorded on the optical disk 2, such as a proxy file and a metadata file, are read by the optical disk apparatus 1, and are recorded in the HDD of the personal computer 201 connected through the network 203.

As described above, when the optical disk 2 is loaded into the optical disk apparatus 1, files for use in editing are automatically in the HDD of the personal computer 201. Thus, the user can easily perform editing, etc., by using the personal computer 201 without selecting files to copy.

Definitely, the optical disk apparatus 1 and the personal computer 201 may be connected to each other not through a cable but through, for example, wireless communication such as the IEEE 802.11a standard. In addition, a plurality of optical disk apparatuses 1 may connected to one personal computer 201.

Similarly to the case of the optical disk apparatus 1 shown in FIG. 1, the above consecutive processing by the personal computer 201 of recording files, such as a proxy file and a metadata file, in the HDD, files which require interpretation at the start of editing process are interpreted beforehand, and the result of the interpretation is recorded in the HDD. In addition, based on a still picture list, an essence mark, etc., a representative picture is also created beforehand, and is recorded in the HDD.

FIG. 14 is a block diagram showing an example of the personal computer 201.

A CPU 211 controls the operation of the entirety of the personal computer 201 in accordance with a program stored in a ROM 212, or a program loaded from an HDD 218 into a RAM 213. The RAM 213 also stores the data required for the CPU 211 to execute various types of processing, etc., as required.

The CPU 211, the ROM 212, and the RAM 213 are connected to one another through a bus 214. The bus 214 also connects to an input/output interface 215.

The input/output interface 215 connects to an input unit 216 including a keyboard and a mouse, a display formed by a liquid crystal display (LCD), etc., an output unit 217 including a speaker, an HDD made up of a hard disk, etc., and an optical disk apparatus interface 219 which is an interface with the optical disk apparatus 1. For example, data which is read from the optical disk 2 by the optical disk apparatus 1 and is transmitted through the cable 202 in FIG. 13A is transmitted by the optical disk apparatus interface 219. The received data is supplied and recorded in the HDD 218 through the input/output interface 215.

The input/output interface 215 connects to a communication unit 220. The communication unit 220 performs communication processing through a network, for example, transmission to a main editing apparatus of information representing the result of editing of proxy data by the user.

A drive 221 is connected to the input/output interface 215, if needed. The drive 221 also connects to a magnetic disk 222, an optical disk 223, a magneto-optical disk 224, a semiconductor memory 225, or the like, if needed. A computer program is read from the storage medium, and is installed in the HDD 218, if needed.

FIG. 15 is a block diagram showing an example functional configuration realized such that a control program is executed by the CPU 211 in FIG. 14.

A recording controller 241, which is realized in the personal computer 201, is similar to the recording controller 81 in FIG. 5, excluding a communication control unit 251 provided in the recording controller 241. In other words, a detecting unit 252, an optical disk data reading unit 253, a control unit 254, a mode setting unit 255, an HDD-data reading unit 256, a writing unit 257, and a representative picture generating unit 258, which are shown in FIG. 15, correspond to the detecting unit 91, the optical disk data reading unit 92, the control unit 93, the mode setting unit 94, the HDD-data reading unit 95, the writing unit 96, and the representative picture generating unit 97, respectively. In FIG. 15, regarding each portion corresponding to that shown in FIG. 5, a detailed description is omitted, if needed.

The communication control unit 251 controls communication with the optical disk apparatus 1 by controlling the optical disk apparatus interface 219. The detecting unit 252 detects a state in which the optical disk 2 is loaded into the drive 38 of the optical disk apparatus 1, and outputs loading-representing information to the optical disk data reading unit 253.

In the optical disk data reading unit 253, the automatic copying mode is set by the mode setting unit 255 similarly to the optical disk data reading unit 92 in FIG. 5. Accordingly, when the detecting unit 252 detects the state in which the optical disk 2 is loaded into the drive 38 of the optical disk apparatus 1, the optical disk data reading unit 253 uses the communication control unit 251 to control the optical disk apparatus 1 to read files such as a proxy file and a metadata file, and acquires the read data. The read data, such as a proxy file and a metadata file, acquired by the optical disk data reading unit 253, is supplied to the writing unit 257 through the control unit 254, and is written, as data for use in editing, in the HDD 218.

Next, processing of the personal computer 201 in, for example, the copying system in FIG. 13A is described below.

Also in the copying system in FIG. 13B, similar processing is performed by the personal computer 201.

Figure 16:
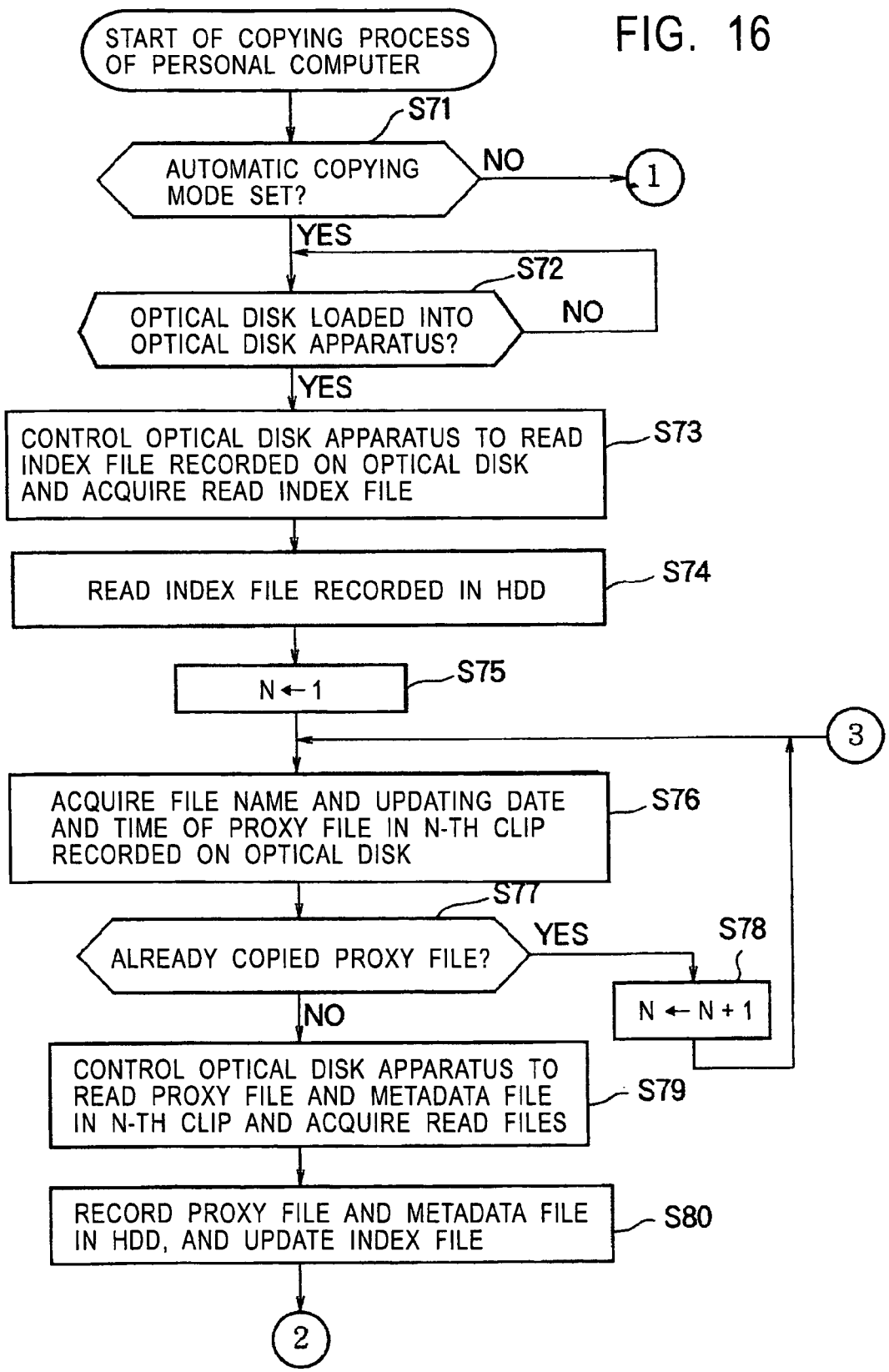
FIG. 16 is a flowchart illustrating a copying process of the personal computer.
Figure 17:
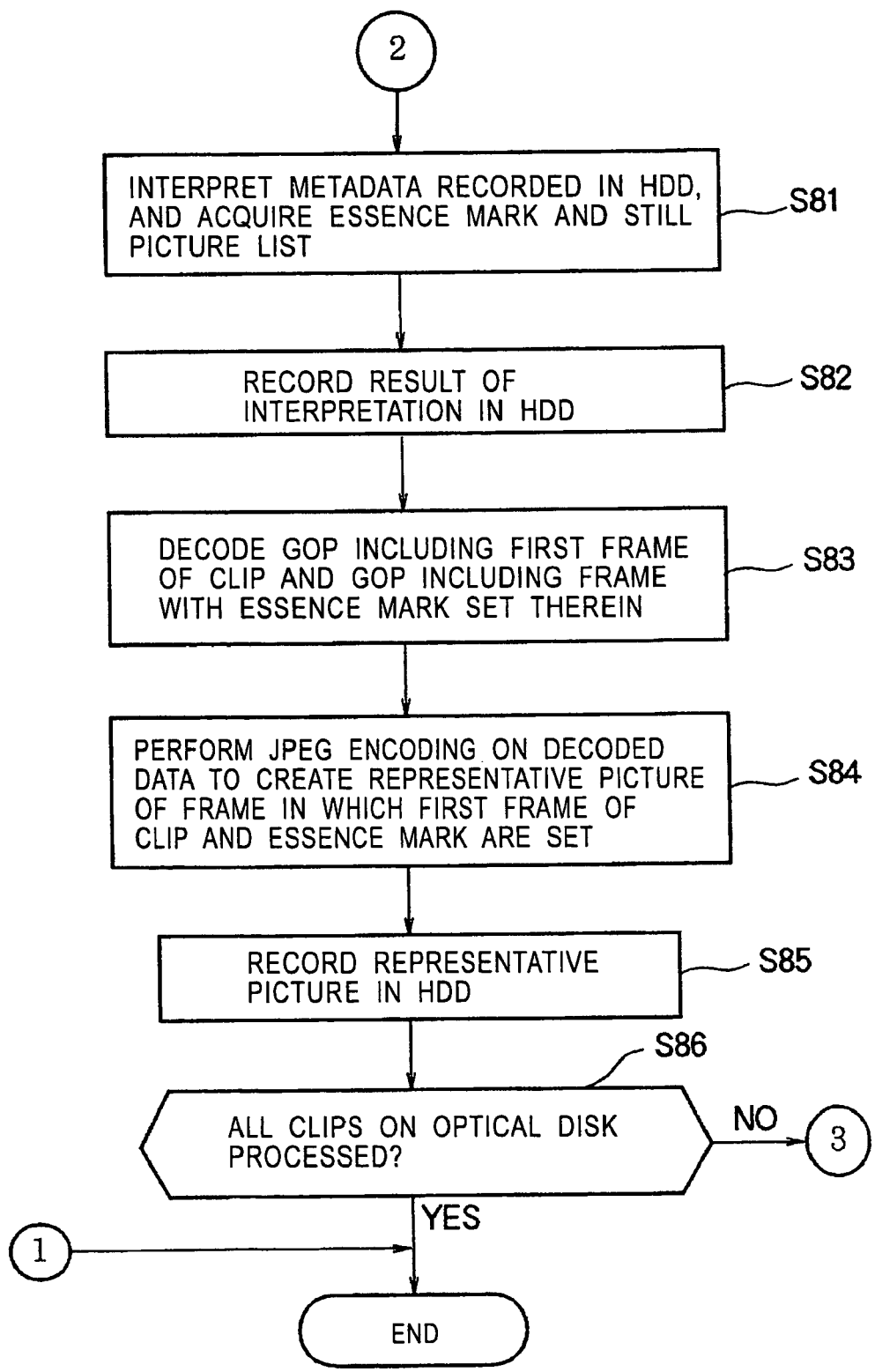
FIG. 17 is a flowchart continued from the flowchart shown in FIG. 16, which illustrates the copying process of the personal computer.

At first, a process of the personal computer 201 which copies data recorded on the optical disk 2 is described below with reference to the flowcharts shown in FIGS. 16 and 17. This process is basically similar to the process of the optical disk apparatus 1 which has already been described with reference to FIGS. 8 and 9. Accordingly, repeated descriptions are omitted, if needed.

In step S71, if the personal computer 201 has determined that the automatic copying mode is set, the optical disk data reading unit 253 proceeds to step S72, and determines, based on an output from the detecting unit 252, whether the optical disk 2 is loaded into the drive 38 in the optical disk apparatus 1, which is connected through the cable 202.

When the detecting unit 252 detects, in step S72, a state in which the optical disk 2, which contains captured data, is loaded into the drive 38 in the optical disk apparatus 1, the optical disk data reading unit 253 proceeds to step S73, and acquires an index file recorded on the optical disk 2 by controlling the optical disk apparatus 1.

At this time, based on an instruction of the optical disk data reading unit 253, a predetermined reading command is transmitted from the communication control unit 251 to the optical disk apparatus 1. Also, in response to reception of the command, data of the index file read from the optical disk apparatus 1 is output from the computer interface 45 (FIG. 4) to the cable 202, and is received by the optical disk apparatus interface 219 in the personal computer 201. The data of the index file received by the optical disk apparatus interface 219 is output to the control unit 254.

In step S74, the HDD-data reading unit 256 reads an index file for managing data, which is recorded in the HDD 218, and outputs the index file to the control unit 254.

In step S75, a determining unit 271 in the control unit 254 refers to information described in the index file which is supplied from the optical disk apparatus 1, and sets "1" in variable N representing the number of a clip which is subject to determination. Proceeding to step S76, the determining unit 271 acquires the file name, and updating date and time of a proxy file of the N-th (in the case of a step performed continuously from step S75, the first) clip recorded on the optical disk 2.

In step S77, based on the proxy file read from the HDD 218, the determining unit 271 determines whether the file name, and updating date and time, acquired in step S76, have already been recorded in the HDD 218. If the determining unit 271 has determined that they have not already been recorded, it proceeds to step S79.

In step S79, by controlling the optical disk data reading unit 92, the determining unit 271 allows the optical disk apparatus 1 to read the proxy file of the N-th clip and a metadata file which is additional information of the clip, and acquires the read proxy file and metadata file. Also in this case, a predetermined reading command is transmitted from the communication control unit 251 to the optical disk apparatus 1 through the cable 202. In response to the command, the proxy file and the metadata file are transmitted from the optical disk apparatus 1.

The proxy file and metadata file acquired from the optical disk apparatus 1 through the cable 202 are output to the writing unit 257 through the control unit 254. In step S80, the output proxy file and metadata file are recorded in the HDD 218 by the writing unit 257. Then, the description of the index file recorded in the HDD 218 is also updated. Information, such as the file names, and updating dates and times of the written proxy file and metadata file, are registered in the index file for managing the data recorded in the HDD 218.

In this manner, the proxy file and metadata file supplied through the cable 202 after being read by the optical disk apparatus 1 are automatically recorded in the HDD 218 in the personal computer 201, without an operation, by the user himself or herself, of designating files, etc.

At this time, proxy video data is supplied from the control unit 254 to the representative picture generating unit 258.

In step S81, the interpretation unit 272 in the control unit 254 interprets clip metadata (e.g., the "C0001M01.XML" file in FIG. 7) in the metadata recorded in the HDD 218, and acquires an essence mark and a still picture list. Proceeding to step S82, the interpretation unit 272 outputs, to the writing unit 257, the result of interpretation including the essence mark and the still picture list. The output result is recorded in the HDD 218.

Essence-mark and still-picture-list information interpreted by the interpretation unit 272 is output to the representative picture generating unit 258. In step S83, based on essence-mark and still-picture-list information supplied from the interpretation unit 272, the representative picture generating unit 258 decodes a GOP of proxy video data including the start frame of the clip, and a GOP of proxy video data including a frame in which an essence mark is set.

In step S84, the representative picture generating unit 258 acquires, from data obtained through decoding in step S83, data of the start frame of the clip or data of the frame in which an essence mark is set, and generates a representative picture. Proceeding to step S85, the representative picture generating unit 258 records the acquired data in the HDD 218.

As described above, similarly to the above-described case of one optical disk apparatus 1, a representative picture is created and stored in the HDD 218. Thus, when the personal computer 201 is instructed to initiate editing, representative pictures are created based on the data recorded in the HDD 218, so that, compared with the case of displaying a list of representative pictures, the user can initiate editing on an editing screen showing a list of the representative pictures quicker by the time required for creation of representative pictures.

In step S86, the determining unit 271 determines whether, for all the clips recorded on the optical disk 2, recording of their proxy files and metadata files in the HDD 218, and creating of clip's representative pictures have ended. If the determining unit 271 has affirmatively determined, the process ends.

The above-described processing is performed whenever the optical disk 2 is loaded into the optical disk apparatus 1 and the loading is detected by the detecting unit 252 in the personal computer 201, whereby files for use in editing, such as a proxy file and a metadata file, are automatically recorded in the personal computer 201 in a state connected through the cable 202.

Figure 18:
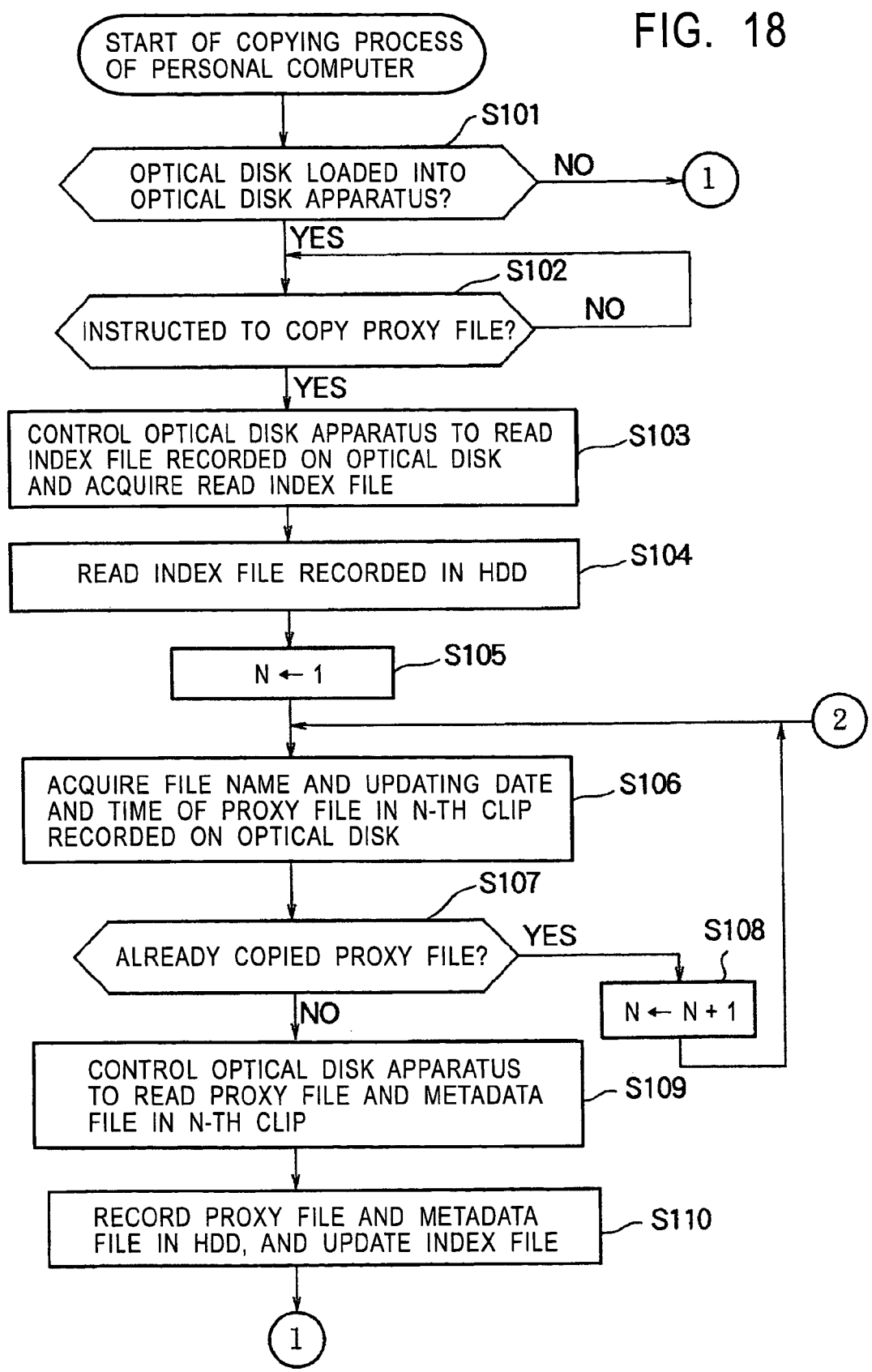
FIG. 18 is a flowchart illustrating another copying process of the personal computer.
Figure 19:
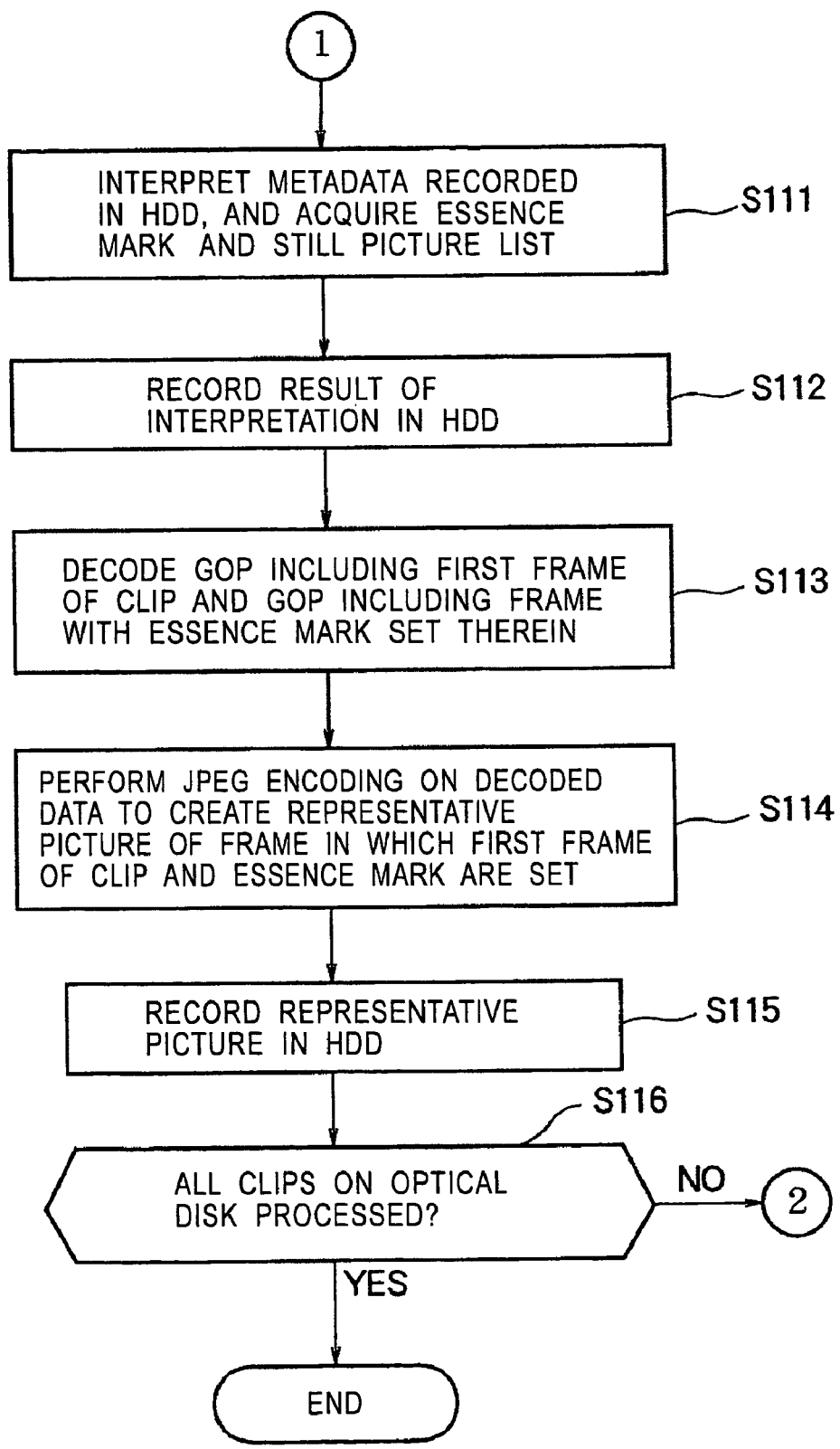
FIG. 19 is a flowchart continued from the flowchart shown in FIG. 18, which illustrates the copying process of the personal computer.

Next, a process of the personal computer 201 which copies, for example, data recorded on the optical disk 2 in a state loaded into the optical disk apparatus 1 shown in FIG. 13A in response to an instruction of the user is described below with reference to the flowcharts shown in FIGS. 18 and 19.

This process corresponds to the process of the optical disk apparatus 1 described with reference to FIGS. 11 and 12.

In step S101, based on an output from the detecting unit 252, the optical disk data reading unit 253 determines whether the optical disk 2 is loaded into the drive 38 in the optical disk apparatus 1. If the optical disk data reading unit 253 has determined that the optical disk 2 is loaded, it proceeds to step S102. The optical disk data reading unit 253 determines whether the personal computer 201 has been instructed by the user to copy a proxy file, etc., recorded on the optical disk 2.

For example, based on an operation on a predetermined copying-start button, if the optical disk data reading unit 253 has determined that the personal computer 201 has been instructed by the user to copy the proxy file, etc., it proceeds to step S103.

Processing in step S103 and thereafter is similar to that in step S73 and thereafter described with reference to FIGS. 16 and 17. Specifically, in step S107, it is determined whether a proxy file of a clip subject to the process is recorded in the HDD 218. If it is determined that the proxy file is not recorded, in step S110, the proxy file, metadata file, etc., read by the optical disk apparatus 1, are supplied and recorded in the HDD 218. In step S115, representative pictures, or the like, created based on the proxy file and the metadata file are recorded in the HDD 218. In step S116, if it is determined that, for all the clips, storing of the proxy file, etc., in the HDD 218, has ended, the process ends.

As described above, also by providing a copying-start button or the like, and initiating copying in response to an operation on the copying-start button, the user can store, in the HDD 218 in the personal computer 201, a predetermined file read from the optical disk apparatus 1 in a state connected through the cable 202.

Based on also the data captured as described above, the editing process as described with reference to FIG. 10 is performed.

The flowcharts shown in FIGS. 20 and 21 show another copying process of the optical disk apparatus 1.

A case in which a proxy file, etc., are copied based on determination of whether the automatic copying mode is set (FIGS. 8 and 9), or whether copying of a proxy file has been designated (FIGS. 11 and 12), has been described. However, in the process in FIGS. 20 and 21, both types of the determination are performed, if needed. Similar processing is executed also by the personal computer 201.

This process is executed, for example, when the power is switched from off-state to on-state (when power is supplied), or with predetermined timing in a state with the power already supplied.

In step S131, the detecting unit 91 determines whether the optical disk 2 is loaded or has already been loaded in the drive 38. If the optical disk 2 has not already been loaded, the optical disk data reading unit 92 is on standby until it determines that the optical disk 2 is newly loaded.

In step S131, if the detecting unit 91 has determined, for example, that the optical disk 2 is loaded, with the power supplied, or that the optical disk 2 has already been loaded in the drive 38 when the power is supplied, the detecting unit 91 proceeds to step S132. Accordingly, for the user, by loading the optical disk 2 in the drive 38, with the power supplied, or by loading the optical disk 2 in the drive 38 and supplying the power (switching the power from off to on), subsequent processing can be executed.

In step S132, based on an output from the mode setting unit 94, the optical disk data reading unit 92 determines whether the automatic copying mode is set.

If the optical disk data reading unit 92 has determined in step S132 that the automatic copying mode is not set, it proceeds to step S133. The optical disk data reading unit 92 determines whether the personal computer 201 has been instructed by the user to copy the proxy file recorded on the optical disk 2. The optical disk data reading unit 92 is on standby until it determines that the personal computer 201 has been instructed. In other words, when the automatic copying mode is not set, even if the optical disk 2 is newly loaded, copying of a proxy file, etc., is not performed until an instruction of the user is received.

In step S133, based on an operation on a copying-start button provided on the operation unit 41, if the optical disk data reading unit 92 has determined that the personal computer 201 has been instructed to start copying, it proceeds to step S134.

If the optical disk data reading unit 92 has determined in step S132 that the automatic copying mode is set, it proceeds to step S134.

Processing in step S134 and thereafter is similar to that in step S2 and thereafter in FIGS. 8 and 9. Specifically, each predetermined clip is sequentially subject to processing in step S136, and it is determined whether a proxy file of the clip has already been recorded in the HDD 46 in step S138. In addition, in steps S141 and S146, a proxy file, a metadata file, and representative pictures created based on the files are recorded in the HDD 46. In step S147, if it is determined that, for all the clips, storing of the proxy file, etc., in the HDD 46 has ended, the process ends.

Since capturing of the proxy file, etc., is performed as described above, by simply loading the optical disk 2 into the optical disk apparatus 1 when the automatic copying mode is set, or only by loading the optical disk 2 into the optical disk apparatus 1 and operating the copying-start button when the automatic copying mode is not set, the proxy file and metadata can be automatically stored by the HDD 46 without directly selecting the files.

Definitely, direct designation of a proxy file (e.g., the proxy file "C0001S01.MXF" shown in FIG. 7) by the user and recording of the designated file in the HDD 46 may be performed. At this time, by enabling the HDD 46 to store metadata corresponding to the proxy file designated by the user, the user can easily initiate editing by using the automatically stored metadata.

The processes of the optical disk apparatus 1 in a state in which the optical disk 2, which contains data captured by a video camera, and the personal computer 201, which is connected through the cable 202, have been described. However, the above function (a function of transferring a proxy file, a metadata file, etc., to an apparatus for editing) of the optical disk apparatus 1 may be provided in the video camera itself.

In addition, a proxy file, a metadata file, etc., are automatically transmitted to a personal computer linked to a video camera through wired or wireless communication, with timing that picture capturing by the video camera has ended, or in real time during picture capturing, and are recorded in a built-in HDD of the personal computer, whereby the user can easily and quickly start editing by operating the personal computer.

The foregoing has described the optical disk apparatus 1 for processing data recorded on the optical disk 2. However, a recording medium loaded into the optical disk apparatus 1 is not limited to the optical disk 2. In other words, the present invention can be applied to an apparatus designed so that, for example, a magnetic disk, a magnetic tap, a semiconductor memory, and other recording media, other than the optical disk 2, can be loaded.

In addition, an apparatus's recording medium (another recording medium) to which data recorded in the loaded recording medium is copied is not limited to a built-in HDD of the apparatus. For example, the recording medium may be an external HDD which is connected through a USB cable, or an HDD which is connected through a network. The apparatus's recording medium may be not an HDD but an optical disk, a semiconductor memory, a magnetic tape or the like.

The above-described consecutive processing can be executed either by hardware or by software. When the consecutive processing is executed by software, a program forming the software is installed in a multipurpose computer or the like.

In the case of executing the consecutive processing by software, the program forming the software is installed from a network or a recording medium into a computer built in dedicated hardware or, for example, a multipurpose personal computer or the like in which various functions can be executed by installing various programs.

As shown in FIG. 14, the recording medium includes the magnetic disk 222 (including a flexible disk), the optical disk 223 (including a CD-ROM (compact disk read only memory) and a DVD (digital versatile disk)), the magneto-optical disk 224 (including MiniDisk (MD) (registered trademark)), and package media formed by the semiconductor memory 225 or the like, which are distributed to provide the user with a program separately from the apparatus. The recording medium also includes the ROM 212, which contains a program, and a hard disk included in the HDD 218.

In the Specification, steps constituting a program recorded in the recording medium include steps which are not always performed in a time-series manner but are performed in parallel or separately as well as steps which are performed on given order in a time-series manner.

In addition, in the Specification, the system unit of the apparatus entirety can be constituted by a plurality of apparatuses.

What is claimed is:

1. An information processing apparatus comprising:
   detection means for detecting loading of a removable recording medium, wherein first data and second data are recorded on the removable recording medium, said first data including content comprising main video or main audio, and said second data including proxy data of the same content as the first data in a compressed amount as compared to the first data;
   determining means for determining whether said second data have already been recorded in another recording medium; and
   recording control means for automatically recording said proxy data in said another recording medium in response either to the loading of the removable recording medium in a power-on state, or a power-supplied state with the removable recording medium loaded, said automatically recording said proxy data occurring when it is determined that said second data have not already been recorded in said another recording medium.

2. An information processing apparatus according to claim 1, wherein:
   said information processing apparatus has an automatic copying mode and a manual copying mode;
   in the automatic copying mode, said recording control means automatically records the proxy data in said another recording medium; and
   in the manual copying mode, said recording control means records the proxy data in said another recording medium in response to a user's copying instruction.

3. An information processing apparatus according to claim 1, further comprising generating means for generating, based on the second data, a representative picture to be displayed on an editing screen,
   wherein said recording control means performs recording of the representative picture in said another recording medium as well as the recording of the proxy data in said another recording medium.

4. An information processing apparatus according to claim 3, wherein:
   at least part of a frame forming picture data in data recorded in the recording medium has preset characteristic information representing the frame; and based on the second data, a still picture of the frame having the preset characteristic information is generated as the representative picture by the generating means.

5. An information processing method comprising the steps of:

detecting loading of a removable recording medium, wherein first data and second data are recorded on the removable recording medium, said first data including content comprising main video or main audio, and said second data including proxy data of the same content as the first data in a compressed amount as compared to the first data; determining whether said second data have already been recorded in another recording medium; and automatically recording said proxy data in said another recording medium in response either to the loading of the removable recording medium in a power-on state, or to a power-supplied state with the removable recording medium loaded, said automatically recording said proxy data occurring when it is determined that said second data have not already been recorded in said another recording medium.

6. A computer program product, for allowing a computer to execute information processing, the computer program product including instructions stored on a non-transitory computer readable medium and adapted to perform operations comprising:

detecting loading of a removable recording medium, wherein first data and second data are recorded on the removable recording medium, said first data including content comprising main video or main audio, and said second data including proxy data of the same content as the first data in a compressed amount as compared to the first data;

determining whether said second data have already been recorded in another recording medium; and automatically recording said proxy data in said another recording medium in response either to the loading of the removable recording medium in a power-on state, or to a power-supplied state with the removable recording medium loaded, said automatically recording said proxy data occurring when it is determined that said second data have not already been recorded in said another recording medium.

* * * * *